US009055235B2

(12) United States Patent
Maeda

(10) Patent No.: US 9,055,235 B2
(45) Date of Patent: Jun. 9, 2015

(54) VIDEO OUTPUT APPARATUS AND VIDEO INPUT DETERMINATION METHOD

(71) Applicant: Hiroshi Maeda, Kanagawa (JP)

(72) Inventor: Hiroshi Maeda, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 14/268,389

(22) Filed: May 2, 2014

(65) Prior Publication Data

US 2014/0333840 A1  Nov. 13, 2014

(30) Foreign Application Priority Data

May 9, 2013  (JP) .................................. 2013-099604

(51) Int. Cl.
*H04N 5/268* (2006.01)
*H04N 5/64* (2006.01)

(52) U.S. Cl.
CPC . *H04N 5/268* (2013.01); *H04N 5/64* (2013.01)

(58) Field of Classification Search
USPC ................. 348/552–570, 705, 706; 710/8–19
See application file for complete search history.

(56) References Cited

U.S. PATENT DOCUMENTS

| 8,214,550 | B2 * | 7/2012 | Chiang et al. ................... 710/16 |
| 2007/0233973 | A1 * | 10/2007 | Uno ............................... 711/154 |
| 2009/0287856 | A1 * | 11/2009 | Ito .................................. 710/19 |
| 2011/0063508 | A1 * | 3/2011 | Nishimura ..................... 348/563 |

FOREIGN PATENT DOCUMENTS

| JP | 2001-255861 | 9/2001 |
| JP | 2008-076455 | 4/2008 |

* cited by examiner

*Primary Examiner* — Michael Lee
(74) *Attorney, Agent, or Firm* — Oblon, McClelland, Maier & Neustadt, L.L.P.

(57) ABSTRACT

A video output apparatus outputs one of image information items received from external storage units. The video output apparatus includes input interfaces, an image information acquisition unit that acquires the image information items from the external storage units through the input interfaces, an output object management unit that manages one of the image information items as an output object among the image information items, an image information presence determination unit that sends a notification of presence or absence of image information to the output object management unit for each of the input interfaces based on whether image acquisition information for acquiring image information has been acquired, and an output unit that outputs an image information item acquired through one of the input interfaces associated with the notification of the presence of image information received from the image information presence determination unit.

9 Claims, 19 Drawing Sheets

SERVER PROJECTION
BY FILE INPUT FROM NETWORK

FIRST CONDITION:
TCP/IP CONNECTION IS ESTABLISHED
SECOND CONDITION:
COMMUNICATION BY HOST PROTOCOL (HTTP, FTP) IS POSSIBLE

EXTERNAL STORAGE PROJECTION
BY FILE INPUT FROM EXTERNAL STORAGE

FIRST CONDITION:
EXTERNAL STORAGE IS DETECTED
SECOND CONDITION:
MEMORY IS MOUNTED AND FILE DETECTION IS POSSIBLE

FIG.5

```
[
 {
  "type":"directory",
  "name":"1"
 },
 {
  "type":"file",
  "name":"1.??????? ?????????.jpg"
 },
 {
  "type":"file",
  "name":" eclipse...jpg "
 },
 {
  "type":"file",
  "name":"eclipse..jpg "
 },
 {
  "type":"file",
  "name":"golf_course.jpg"
 },
 {
  "type":"file",
  "name":"??eclipse...jpg"
 },
 {
  "type":"file",
  "name":"??eclipse..jpg"
 }
]
```

VIDEO OUTPUT APPARATUS AND VIDEO INPUT DETERMINATION METHOD

BACKGROUND OF THE INVENTION

1. Field of the Invention

The present invention relates to a video output apparatus which outputs one of image information items received from external storage units.

2. Description of the Related Art

To project an image by a projector, a video signal is input to the projector from a computer. Some projectors may have a plurality of input interfaces (I/F). For example, input interfaces to which image cables are connected, such as D-Sub, HDMI, and DisplayPort, are known. In the following, the input of a video signal by the image cable is called cable input. The projector of this type only includes a single projection lens and a single optical engine and has to select one of the plurality of input interfaces to which video signals are input as an input interface of a video signal for projection. If the input interface connected to an image cable to which the video signal for projection is input changes, the projector has to switch the input interface to the input interface of the video signal for projection.

For example, a case in which a projector and a computer are connected by a RGB cable of a D-Sub connector to project an image by the projector is considered. In this case, it is necessary to connect the RGB cable from the computer to the projector and switch the input interface used for projection by the projector to the D-Sub interface. In a method of performing switching of video-signal inputs according to the related art, the switching of video-signal inputs is performed by a user's key operation on a body portion of the projector or a remote controller of the projector.

Moreover, a method of performing the switching of the video signals according to the cable input automatically is also known in the art. In this method, a computer and a projector are connected by a cable and when the projector detects reception of a video signal from the outside and determines the presence of the video signal, the switching of the video signals is performed.

Furthermore, a method of performing the switching of the input interfaces according to the cable input is also known in the art. In this method, the presence of the video signals by the cable input is checked sequentially according to the switching order of the input terminals.

For example, Japanese Laid-Open Patent Publication No. 2001-255861 discloses an automatic switching method. In this method, when a switching request to a next input terminal is received from an input device, the switching order of the input terminals stored in a storage part is retrieved. A second retrieval part checks whether an input signal is present in a signal input state information corresponding to the next input terminal based on the retrieved input terminal information. When the input signal is present in the information, a switching process to switch the present input terminal to the next input terminal is performed.

In recent years, projectors may project an image file or a motion picture file received from a network and may project an image file or a motion picture file stored in an external storage, such as a USB memory. In the following, the input of a video signal by the image file or the motion picture file is called file input.

For example, a projector and a server may be connected via a network and an image of the content (an image file, a motion picture file, etc.) stored in the server may be projected by the projector. In the following, the projection of the image in this way is called server projection. Moreover, an external storage may be connected to a projector and an image of the content stored in the external storage may be projected by the projector. In the following, the projection of the image in this way is called external storage projection.

Therefore, it is necessary for a projector including a plurality of input interfaces according to the file input to perform the switching of the input interfaces.

In a case of the file input, the projector according to the related art simply determines presence of a video signal when a user operates the projector to switch the input of the video signal to the file input. If the user manually switches the input of the video signal to the server projection, the projector according to the related art simply determines the presence of the video signal of the server projection. Moreover, the projector according to the related art simply determines presence of a video signal when connection between the projector and an external storage is established. For example, if the projector detects connection of an external storage to the projector, the projector according to the related art simply determines the presence of an image file for projection.

As described above, the switching method of performing switching of the input interfaces by the file input according to the related art simply determines whether a user's operation is performed on the projector, or determines whether an external storage is connected to the projector. However, this is insufficient for determining whether an image of the content in the server or the external storage may be properly projected by the projector. In other words, there may be a case in which even if the user operates the projector to switch the image input to the server projection, the projector is not connected to the server via the network. There may be also a case in which even if the projector detects connection of an external storage to the projector, a file system of the content in the external storage is damaged and an image file may not be read from the external storage. Therefore, even if an image file may not be read from the server or the external storage and an image of the content may not be properly projected, the switching method according to the related art determines the presence of the video signal. In such a case, the switching of the input interfaces may not be performed appropriately.

SUMMARY OF THE INVENTION

In one aspect, the present invention provides a video output apparatus which performs switching of input interfaces when an image of a video signal according to the file input from a server or an external storage may be properly projected.

In one embodiment, the present invention provides a video output apparatus which outputs one of image information items received from external storage units, the video output apparatus including: input interfaces to which the image information items from the external storage units are input respectively; an image information acquisition unit configured to acquire the image information items from the external storage units through the input interfaces; an output object management unit configured to manage one of the image information items as an output object among the image information items acquired by the image information acquisition unit; an image information presence determination unit configured to send a notification of presence or absence of image information to the output object management unit for each of the input interfaces based on a result of determination as to whether image acquisition information for acquiring image information has been acquired by the image information acquisition unit; and an output unit configured to output an image information item acquired through one of the input interfaces, the one of the input interfaces being associated with the notification of the presence of image information received from the image information presence determination unit at the output object management unit.

Other objects, features and advantages of the present invention will become more apparent from the following detailed description when read in conjunction with the accompanying drawings.

BRIEF DESCRIPTION OF THE DRAWINGS

FIG. 5 is a diagram showing an example of content information which is transmitted from a server to the projector according to the embodiment.

DETAILED DESCRIPTION OF THE PREFERRED EMBODIMENTS

A description will be given of embodiments with reference to the accompanying drawings.

Figure 1A:
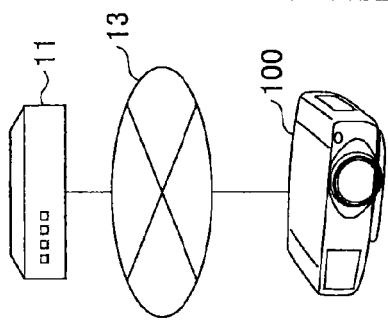
FIG. 1A and FIG. 1B are diagrams showing typical conditions for performing automatic switching of input interfaces in a projector according to an embodiment.
Figure 1B:
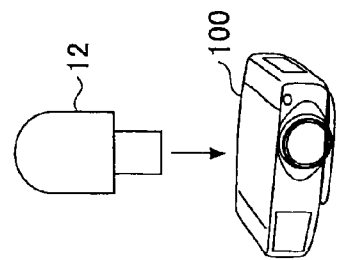

FIG. 1A and FIG. 1B are diagrams showing typical conditions for performing automatic switching of input interfaces in a projector 100 according to an embodiment. The projector 100 is an example of a video output apparatus in the appended claims. In this embodiment, a video signal of the image input is equivalent to a video signal for projection.

The conditions for the projector 100 to determine presence of a video signal include (i) a first condition that a connection between the projector 100 and an external device is established, and (ii) a second condition that the projector 100 is able to acquire content information from the external device.

The content information is information for reading the content, including a storage location of an image file for projection or a motion picture file for projection, and a file name of the image file or the motion picture file. The content information is an example of image acquisition information in the appended claims. In addition, the content information may include a date and time of creation, a date and time of update, a file size, a file type, etc. which are obtained from a file system. If the content information is acquired, the content may be selectively accessed by the projector 100. Therefore, if the content information may be acquired, an image of an image file or a motion picture file may be projected. The content is equivalent to an image file or a motion picture file. Examples of image files include JPEG, BMP, GIF, PNG files, etc. Examples of motion picture files include MPEG2, WMV, MP4 files, etc.

Moreover, examples of the video signal include a video signal transmitted from a server via a network as an image file, and a video signal read from an external storage as an image file. In the following, projecting an image of an image file received from a server as the video signal is called server projection, and projecting an image of the image file received from an external storage as the video signal is called external storage projection.

FIG. 1A shows typical conditions for performing switching of input interfaces to the server projection in the projector 100 according to the embodiment. The first condition in this case is that a TCP/IP (transmission control protocol/internet protocol) connection (or UDP/IP (user datagram protocol/internet protocol) connection) between the projector 100 and a server 11 via a network 13 is established. The second condition (the projector 100 is able to acquire content information) in this case is that an HTTP request for acquisition of content information and an HTTP response of the content information acquisition are normally exchanged.

FIG. 1B shows typical conditions for performing switching of the input interfaces to the external storage projection in the projector 100 according to the embodiment. The first condition (a connection between the projector 100 and an external storage unit 12 is established) in this case is that a connection of the external storage unit 12 to the projector 100 is detected. The second condition (the projector 100 is able to acquire content information) in this case is that the external storage unit 12 is mounted and the projector 100 is able to detect a folder/file structure of the external storage unit 12.

In this way, it is possible to determine appropriately whether an image of the video signal according to the file input may be properly projected by making the determination as to whether the connection between the projector 100 and the external device is established, and making the determination as to whether the content information from the external device is able to be acquired by the projector 100. Therefore, it is correctly determined that the file input is performed, and switching of the input interfaces to the server projection or the external storage projection may be performed automatically.

In addition, besides the input of a video signal according to the file input, there is also the input of a video signal according to the cable input in which a video signal is input to the projector by connecting image cables, such as a RGB cable or a HDMI cable, to the projector and receiving the video signal from the image cables. A video signal may be determined from among a plurality of video signals according to the cable input. However, in the projector 100 according to the embodiment, the video signal is determined as the image input from among a plurality of video signals according to the file input.

Figure 2:
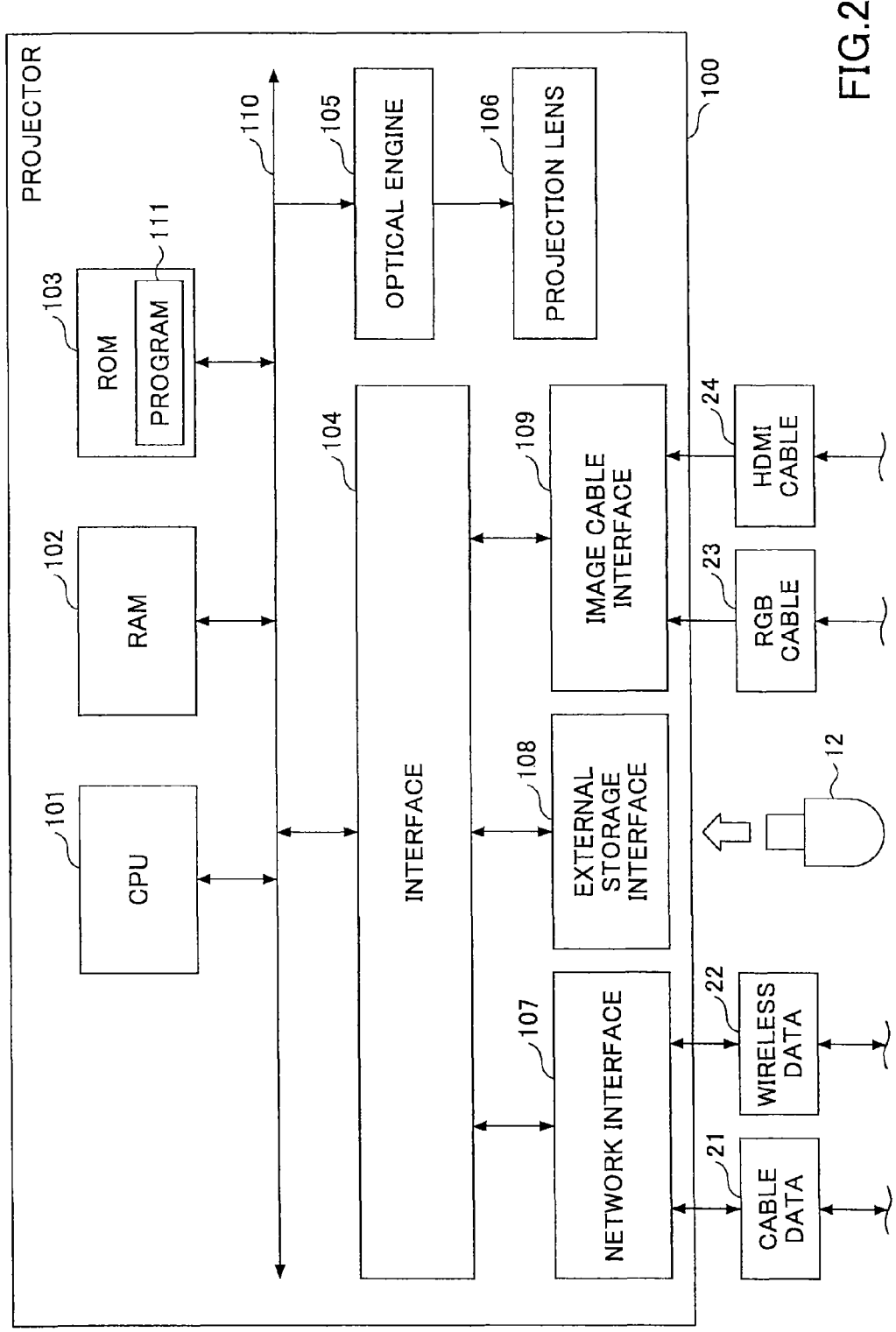
FIG. 2 is a block diagram showing a hardware composition of the projector according to the embodiment.

FIG. 2 is a block diagram showing a hardware composition of the projector 100 according to the embodiment. As shown in FIG. 2, the projector 100 include a CPU 101, a RAM 102, a ROM 103, an interface (I/F) 104, and an optical engine 105, which are interconnected by an internal bus 110. A network interface 107, an external storage interface 108, and an image cable interface 109 are connected to the interface 104. A program ill is stored in the ROM 103. The CPU 101 executes the program ill read from the ROM 103 and controls the overall projector 100. The RAM 102 provides a work memory of the CPU 101, and stores a video signal according to the file input. The interface 104 includes a peripheral bus, a DMA (direct memory access) controller, a bus controller, etc. The interface 104 arbitrates the priority of data which are received by the network interface 107, the external storage interface 108, and the image cable interface 109, and stores the data in the RAM 102. Moreover, the interface 104 outputs the data to the network interface 107, the external storage interface 108, and the image cable interface 109.

For example, the network interface 107 is implemented by an Ethernet card for connecting the projector 100 to a LAN (local area network). The network interface 107 may include two network interfaces which are in conformity with the cable LAN requirements (IEEE 802.3x) and the wireless LAN requirement (IEEE 802.11). Cable data 21 and wireless data 22 are input to the network interface 107 as the communication data.

An external storage unit 12, such as a USB memory or an SD memory card, is attached to the external storage interface 108. A connection of the external storage unit 12 to the external storage interface 108 is detected and a notification of the connection is sent to the CPU 101 (where an interrupt is generated).

The image cable interface 109 is an interface that acquires a video signal from image cables, such as an analog image cable or a digital image cable. For example, an RGB cable 23 for transmitting an analog video signal and a HDMI (high-definition multimedia interface) cable 24 for transmitting a digital video signal are connected to the image cable interface 109. These cables and signal types are provided as examples. When a video signal according to the cable input is received at the image cable interface 109, the image cable interface 109 detects the reception of the video signal and sends a notification of the detection to the CPU 101 (where an interrupt is generated).

Therefore, in the projector 100 according to the embodiment, the input of a video signal according to the file input is performed by the network interface 107 and the external storage interface 108. Alternatively, the input of a video signal according to the file input may be performed by another interface of the projector 100 different from the interfaces 107 and 108.

For example, the optical engine 105 performs image projection by using a DLP (digital light processing) system utilizing a DMD (digital micromirror device). In addition, other image projection systems include a 3LCD (three-panel liquid crystal display) system utilizing a transmissive liquid crystal device, a LCOS (liquid crystal over silicon) system utilizing a reflective liquid crystal device, etc. The projector 100 according to the embodiment may use the image projection system of any type to perform image projection.

The projection lens 106 may include a fixed focus lens or a zoom lens according to the specifications of the projector 100. In addition, the projection lens 106 has a brightness, a focal distance, an angle of view, and other functions according to the specifications of the projector 100.

Figure 3:
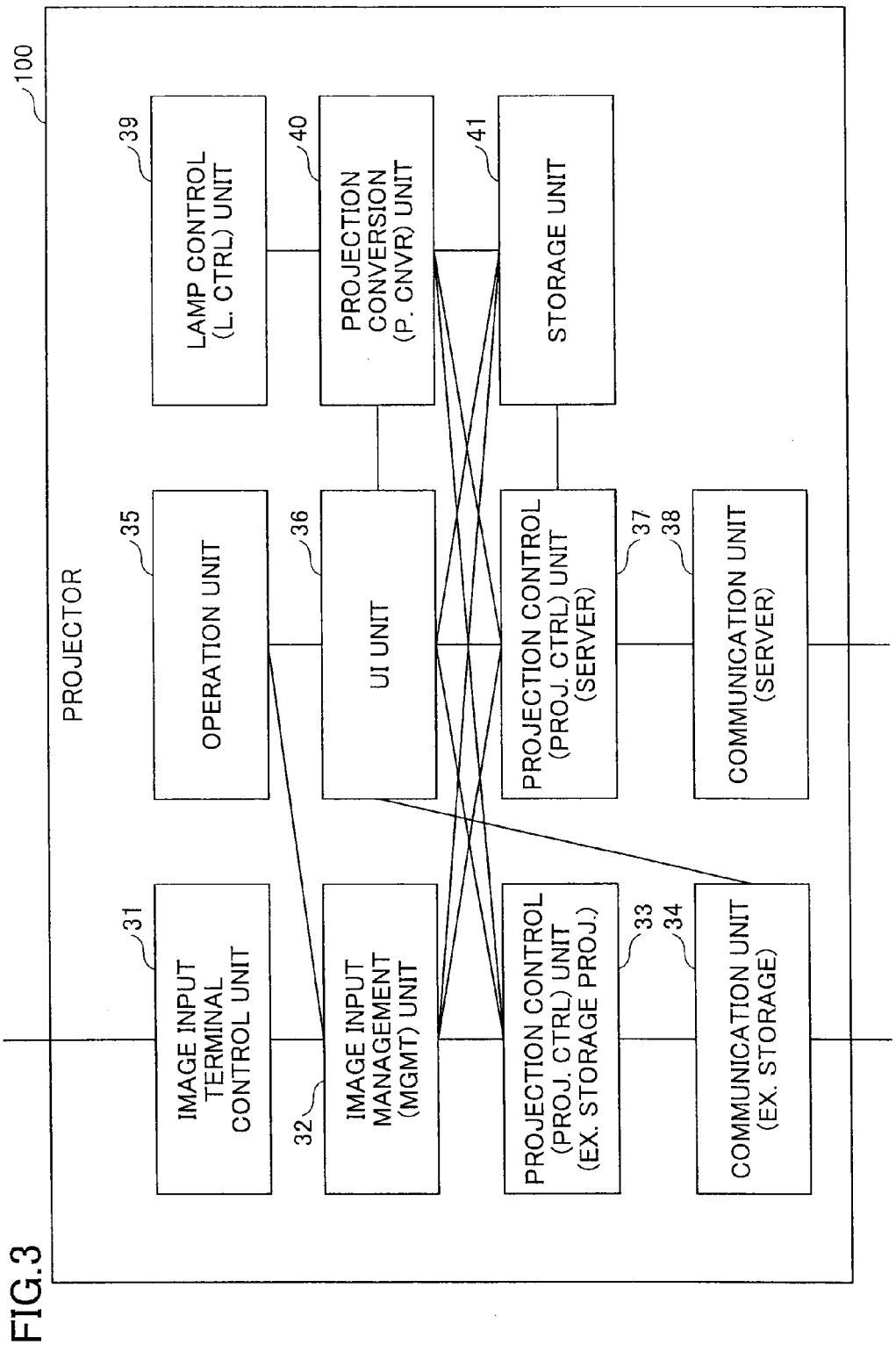
FIG. 3 is a block diagram showing a functional composition of the projector according to the embodiment.

FIG. 3 is a block diagram showing a functional composition of the projector 100 according to the embodiment.

In the projector 100 shown in FIG. 3, an image input terminal control unit 31 controls an image input terminal for connecting an image cable to the projector 100. For example, the image input terminal is equivalent to the image cable interface 109 shown in FIG. 2. Examples of the image input terminal include a D-Sub (RGB cable connector) connector, a HDMI (high-definition multimedia interface) connector, a DisplayPort connector, etc.

An operation unit 35 inputs an instruction for operating the projector 100 given by a user. For example, the operation unit 35 includes a set of hard keys arrayed on a body part of the projector 100, an infrared receiver unit to receive a manipulation signal output from a remote controller, etc. In addition, the projector 100 may project an operation menu with a cursor, and the operation unit 35 may receive a signal indicating a movement of the cursor and a depression of an OK key given by the user.

A lamp control unit 39 controls the optical engine 105 (FIG. 2) so that an image may be projected by the projector 100. Specifically, a projection conversion unit 40 converts image data into projection data for controlling the optical engine 105, and the lamp control unit 39 controls the optical engine 105 according to the projection data produced by the projection conversion unit 40. In addition, the lamp control unit 39 controls a brightness and a power consumption of a lamp for projecting an image by the projector 100.

An image input management unit 32 stores a present projection input state of the projector 100 which indicates whether the video signal related to the currently projected image is derived from the cable input or the file input. Moreover, the image input management unit 32 stores a result of determination which indicates presence or absence of the video signal for each of the input interfaces. Furthermore, when a video signal changes from an absent state to a present state and there is no other video signal which is determined as being in a present state, the image input management unit 32 performs switching of the input interfaces to the video signal having changed to the present state as the image input. When the video signal stored as the image input changes from the present state to an absent state, the image input management unit 32 performs switching of the input interfaces to an arbitrary video signal as the image input. For example, the video signal is determined as the image input according to a predetermined priority level, or the video signal having been determined as in a present state first or last is determined as the image input.

A UI (user interface) unit 36 stores screen information containing a menu screen and various notification screens (an error notification screen, a warning screen, etc.) and creates a screen according to the state of the projector 100 or the user's instruction for operation of the projector 100 so that the created screen is projected by the projector 100.

The projection conversion unit 40 converts image data, such as the content (an image file, a motion picture file, etc.) and the screen information stored in the UI unit 36, into the projection data for controlling the optical engine 105 to project an image. For example, the projection conversion unit 40 converts the image data of each of RGB color image data into the projection data for controlling the optical engine 105. In a case of the DLP system, the projection data to control an orientation of the DMD is produced by the projection conversion unit 40.

A projection control unit 33 controls an overall image projection process for performing image projection of the content from the external storage unit 12 (the external storage projection). A projection control unit 37 controls an overall image projection process for performing image projection of the content from the server 11 (the server projection).

A storage unit 41 stores persistence data which has to be retained in the projector 100 unless the projector 100 is otherwise modified. The storage unit 41 may be implemented by a flash memory. The persistence data includes a URL (uniform resource locator) of the server 11, a display setting of a menu set up by the user, a lamp activation time, etc.

A communication unit (external storage) 34 performs a control for reading content information and content from the external storage unit 12 connected to the projector 100. For example, in order for the communication unit 34 to read content from a USB memory, mounting the USB memory is needed. The mounting of the USB memory is performed by an OS (operating system) of the projector 100 which recognizes the USB memory as a drive or a folder and enables accessing of an image file of the USB memory by using a file system of the OS. In a case in which the external storage unit 12 is a USB memory and the projector 100 uses a Windows system as the OS, the OS recognizes the USB memory (associated with a USB mass storage class) as a drive and mounts the USB memory to the file system of the OS. In a case in which the projector 100 uses a UNIX system or a LINUX system as the OS, the communication unit 34 detects connection of the USB memory to the projector 100 and executes a predetermined command so that the USB memory is mounted to the file system of the OS. Thereby, accessing the content in the USB memory is enabled.

A communication unit (server) 38 performs communication between the projector 100 and the server 11 connected to the projector 100 via the network 13. For example, the communication unit 38 performs a process of a necessary communication protocol among the communication protocols in the protocol stack of the network 13. For example, the communication unit 38 performs a process of a necessary communication protocol based on the TCP/IP (UDP/IP). Moreover, the communication unit 38 performs a process according to the communication protocol of the application layer of the server 11. Examples of the communication protocols include HTTP (hypertext transfer protocol), WebDAV (web distributed authoring and versioning), SMB (sever message block), FTP (file transfer protocol), SNMP (simple network management protocol), etc. However, the communication protocol performed by the communication unit 38 is not limited to these examples.

Figure 4:
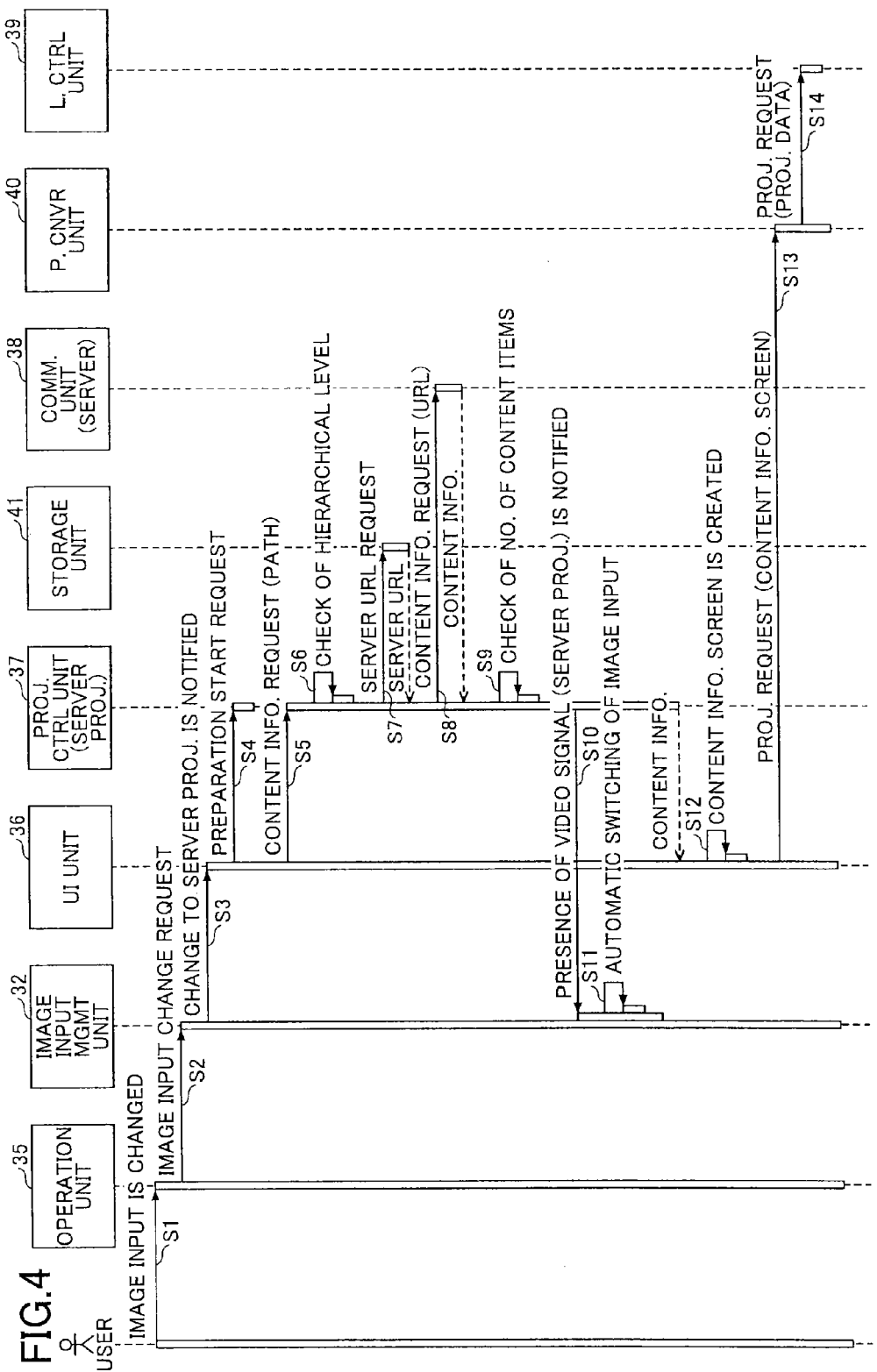
FIG. 4 is a sequence diagram for explaining a process in which the projector according to the embodiment communicates with a server and projects an image of the content from the server.

FIG. 4 is a sequence diagram for explaining a process in which the projector 100 according to the embodiment communicates with the server 11 and projects an image of the content from the server 11. In order to project an image of the content from the server 11, the projector 100 acquires the content information from the server 11 which indicates a detailed folder/file structure of the content from the server 11, and projects a screen of the content information. The process shown in FIG. 4 is described.

In step S1, a user operates the operation unit 35 to change the image input of the projector 100 to the server projection. It is assumed that an image of the content is not projected by the projector 100 at this time.

In step S2, the operation unit 35 sends to the image input management unit 32 an image input change request to change the image input of the projector 100 to the server projection, and the image input management unit 32 stores the server projection as the image input.

In step S3, the image input management unit 32 sends to the UI unit 36 a notification that the image input is changed to the server projection.

In step S4, the UI unit 36 sends a projection preparation start request to the projection control unit 37. The projection preparation start request causes the projection control unit 37 to be started and initialized.

In step S5, the UI unit 36 sends a content information acquisition request to the projection control unit 37. At this time, specifying a path of the content information as an argument of the request is needed, and a root directory ("/") is specified as an initial value.

In step S6, the projection control unit 37 checks a hierarchical level of the path specified in step S5. Checking the hierarchical level of the path by the projection control unit 37 will be described later with respect to FIG. 8.

In step S7, the projection control unit 37 sends to the storage unit 41 a request of acquisition of a URL of the server 11 (server URL). The server URL indicates a location of the server 11 in the network 13 and is expressed in a form, such as "http://www.example.com/projection/". Alternatively, an IP address of the server 11 may be registered in the storage unit 41. For example, the location of the server 11 may be set up in advance by the user from the menu screen displayed on the projector 100 and the URL of the server 11 may be stored in the storage unit 41. Or the projector 100 may search for a corresponding server 11 in the network in advance. Or the location of the server 11 may be set up by using a short-range radio communication technique.

Alternatively, the step S7 may be eliminated from the process of FIG. 4 and the URL of the server 11 may be manually input by the user in the step S1. Moreover, any other locator different from the URL may be used instead if the location of the server 11 may be recognized from the locator.

In step S8, the projection control unit 37 sends a content information acquisition request to the communication unit (server) 38 by specifying the server URL as an argument of the request. The communication unit (server) 38 accesses the URL of the server 11 by HTTP communication, and acquires the content information from the server 11. The content information is transmitted from the communication unit 38 to the projection control unit 37. An example of the content information will be described later with reference to FIG. 5.

In step S9, the projection control unit 37 checks the number of content items included in the acquired content information. Checking the number of content items will be described later with reference to FIG. 8.

In step S10, the projection control unit 37 sends to the image input management unit 32 a notification indicating the presence of the video signal of the server projection. This notification is sent to the image input management unit 32 by the projection control unit 37 when the content information has been acquired. A detailed process will be described later with reference to FIG. 8. If the content information may not be acquired, the projection control unit 37 sends to the image input management unit 32 a notification indicating the absence of the video signal.

In step S11, the image input management unit 32 performs switching of the input interfaces to the server projection automatically according to a response of the presence of the video signal or the absence of the video signal. In the example of FIG. 4, the presence of the video signal or the absence of the video signal is uncertain in step S3, but the presence of the video signal of the server projection is determined in step S11. In this case, the projection object source is to be changed to the server projection. However, as described above, the image input of the projector 100 is already changed to the server projection in step S2, and no operation is done. If the absence of the video signal is notified, an error notification screen is displayed to the user.

In step S12, the UI unit 36 acquires the content information from the projection control unit 37 and creates a content information screen for displaying the acquired content information. Specifically, the acquired content information is inserted in a template of the content information screen in which arrangement locations of file names, buttons to be operated by the user, messages to be displayed, etc. are defined. An example of the content information screen will be described with reference to FIG. 6.

In step S13, the UI unit 36 sends a projection request of the content information screen to the projection conversion unit 40. The projection conversion unit 40 converts image data of the content information screen into the projection data that may be handled by the lamp control unit 39.

In step S14, the projection conversion unit 40 sends a projection request of the projection data of the content information screen to the lamp control unit 39. In response to the request, the lamp control unit 39 projects an image of the projection data.

FIG. 5 is a diagram showing an example of the content information transmitted from the server 11 to the projector 100 according to the embodiment.

As shown in FIG. 5, the content information is described in a JSON form (JavaScript object notation). A single content item in the content information is enclosed in a pair of parentheses "{ }", "type" indicates a distinction between folder and file, and "name" indicates a folder name or a file name. In the example of FIG. 5, "directory" is indicated as "folder" because the notation of directory or folder varies depending on the type of the OS of the server 11. Alternatively, "folder" may be used instead of "directory". Moreover, "?" is indicated in the content information in a case in which a corresponding character code (font) is not registered in the projector 100. "?" is eliminated if the corresponding character code is registered in the projector 100. By using the content information in this way, a type (folder/file) and a folder name or a file name may be acquired for every content item.

In addition, transmitting and receiving the content information in JSON form is not needed. Alternatively, content information in XML form or in a plain text of content information may be transmitted and received. Moreover, the information included in the content information is not limited. If each content item in the content information is distinguishable, any information may be included in the content information. The content information may not include a data name and a data type. The content information may include a date and time of update and a data size only. Alternatively, the content information may include an update date and a data size in addition to other data items, such as a data name and a data type.

Figure 6:
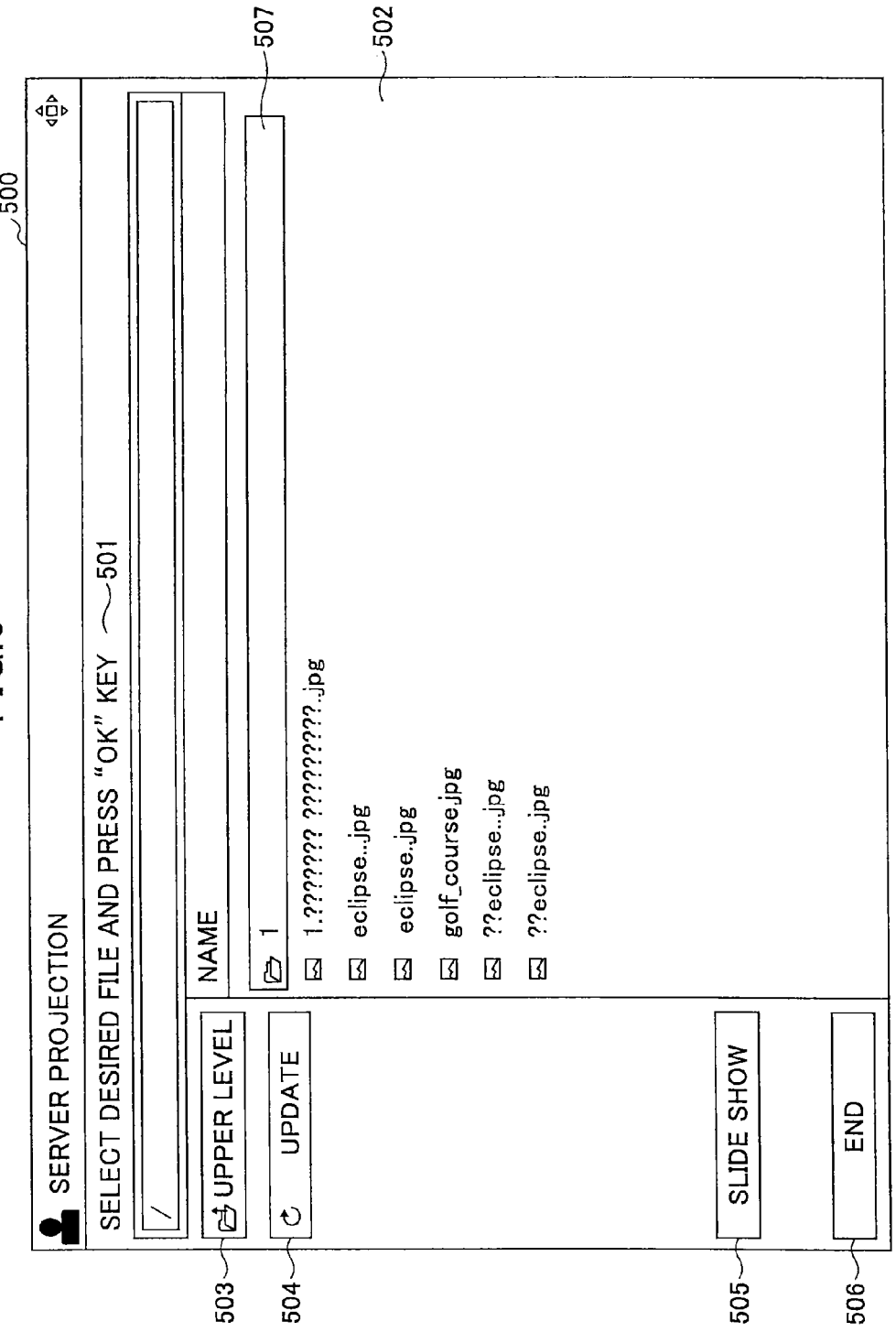
FIG. 6 is a diagram showing an example of a content information screen.

FIG. 6 is a diagram showing an example of a content information screen 500. As shown in FIG. 6, this content information screen 500 is projected by the projector 100 and includes a message 501 "Select a desired file and press an "OK" key". The content information screen 500 further includes a content information portion 502, an upper level button 503, an update button 504, a slide show button 505, an end button 506, and a cursor 507.

In the content information portion 502, a list of folder names with folder icons affixed thereto, or a list of file names with file icons affixed thereto is displayed. In order to select a desired file among the files of the content information portion 502, a user operates the operation unit 35 to move the cursor 507 to the desired file and presses an "OK" key (not illustrated) of the operation unit 35.

After the desired file (for example, .jpg file) is selected by the user, a screen of the content information of the selected file is projected by the projector 100. After one of the folders of the content information portion 502 is selected by the user, a screen of the content information of the selected folder is projected by the projector 100. In order to acquire a list of folder names or a list of file names in an upper level folder of the present folder, the user operates the operation unit 35 to move the cursor 507 to the upper level button 503 and presses the "OK" key. A process performed by the projector 100 according to the embodiment to select a new folder in the content information portion 502 will be described later.

The update button 504 is a button provided to update the displayed content information to the most recent content information. The slide show button 505 is a button provided to project sequential images of the content items in the displayed content information. The end button 506 is a button provided to terminate the image projection of the content information.

Figure 7:
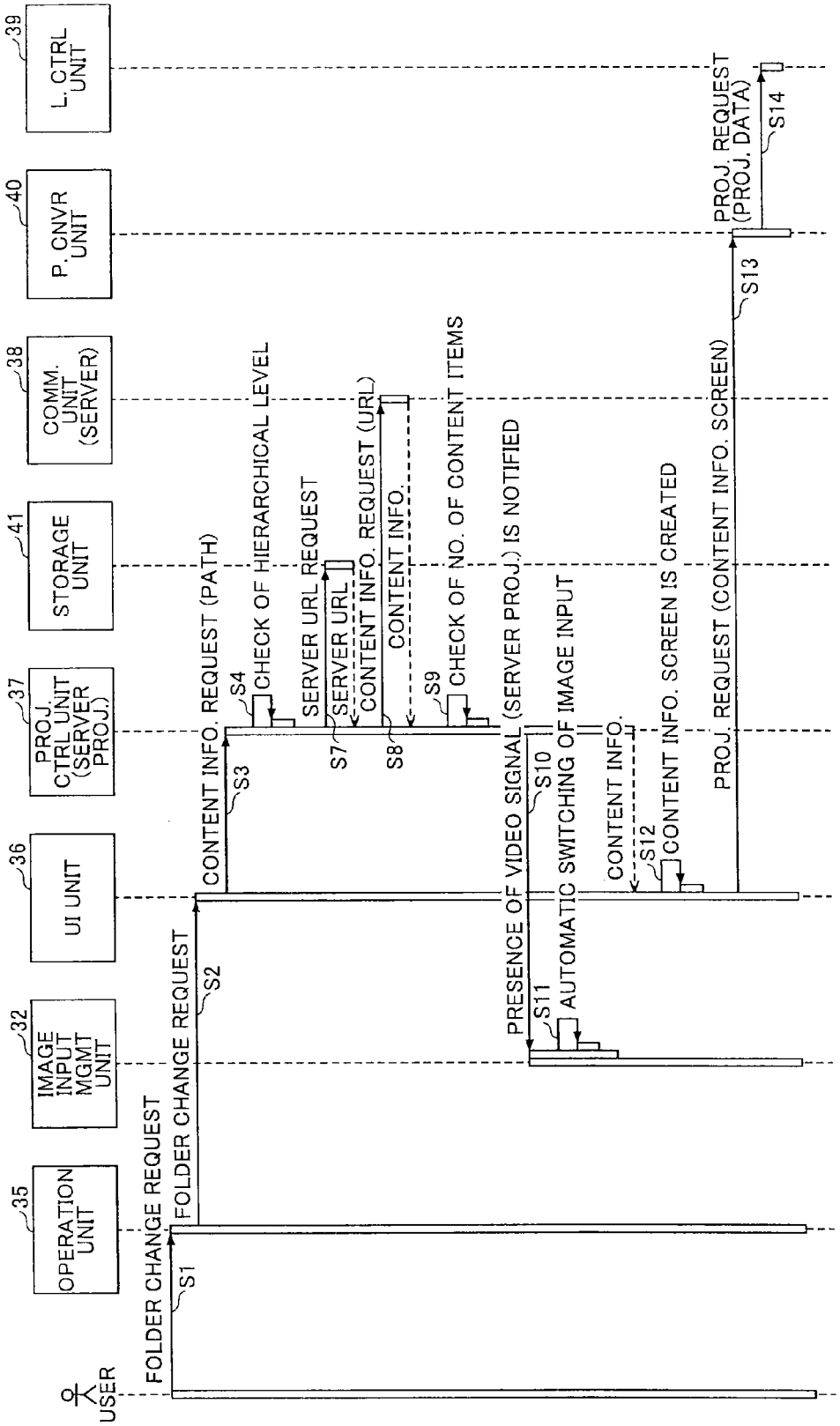
FIG. 7 is a sequence diagram for explaining a process performed by the projector according to the embodiment when a user selects a new folder.

FIG. 7 is a sequence diagram for explaining a process performed by the projector 100 according to the embodiment when a user selects a new folder. The process shown in FIG. 7 is described.

In step S1, a user operates the operation unit 35 to change the folder containing the file whose image is projected by the projector 100 to a new folder. Specifically, the cursor 507 (FIG. 6) is moved to the new folder and the "OK" key is pressed, or the upper level button 503 is pressed.

In step S2, the operation unit 35 sends a folder change request to the UI unit 36.

In step S3, the UI unit 36 sends a content information acquisition request to the projection control unit 37. At this time, a path of the content information is specified as an argument of the request. This path is automatically determined by the present folder and the folder selected by the user. For example, if a folder with a folder name "1" in the content information screen of FIG. 6 is selected, a character string "/1" is passed as an argument of the content information acquisition request. In this case, the present folder is a root directory (/) and a path to the "1" folder in the root directory is specified.

In step S4, the projection control unit 37 checks a hierarchical level of the path specified in step S3. Checking the hierarchical level of the path by the projection control unit 37 will be described later with reference to FIG. 8.

The process of subsequent steps S7-S14 in FIG. 7 is essentially the same as the process of steps S7-S14 in FIG. 4 and a description thereof will be omitted.

By performing the process shown in FIG. 7, the screen of the content information of the selected folder is projected. After the projection, the user may move the cursor in a similar manner in the content information screen of FIG. 6. If a folder is selected by the user, a screen of the content information of the selected folder is projected. If a file is selected by the user, an image of the content of the selected file is projected.

A case in which a file is selected by a user is described briefly. In this case, the operation unit 35 sends a notification of the selected content information to the image input management unit 32. The image input management unit 32 stores the server projection as the present image input and sends a notification of the selected content information to the projection control unit 37. The projection control unit 37 causes the communication unit (server) 38 to acquire the selected content and send the acquired content to the projection conversion unit 40. The projection conversion unit 40 converts image data of the content into projection data, so that the lamp control unit 39 is controlled according to the projection data.

Figure 8:
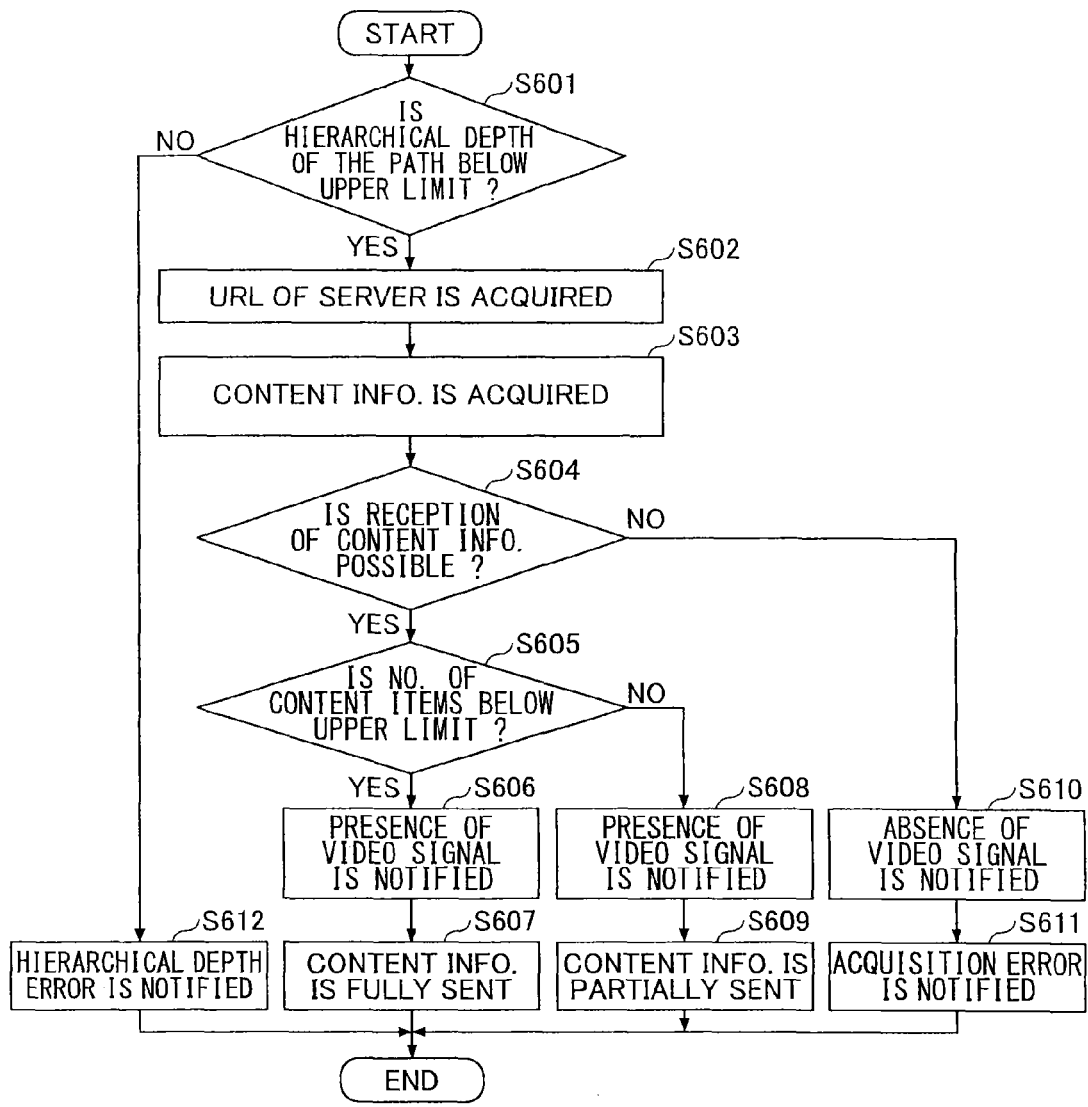
FIG. 8 is a flowchart for explaining a process in which a projection control unit (server projection) receives a content information acquisition request and returns a response to the content information acquisition request.

Next, FIG. 8 is a flowchart for explaining a process in which the projection control unit 37 receives a content information acquisition request and returns a response to the content information acquisition request. The projection control unit 37 determines the presence or the absence of the video signal depending on whether the content information has been acquired, and sends a notification of the presence or the absence of the video signal to the image input management unit 32.

As shown in FIG. 8, the projection control unit 37 first determines whether a hierarchical depth of the path specified by the UI unit 36 is below an upper limit (first threshold) (S601). Because the number of hierarchical levels of the path by which the projector 100 is able to display a screen of the content information is limited, the upper limit is predetermined for the hierarchical depth of the path according to the functional specifications. Hence, the determination step S601 is performed.

In the example of FIG. 4, the path is initially set to the root directory "/", and in the example of FIG. 7, the path is set to "/1" by changing the initial folder to the lower-level folder. The hierarchical depth is determined by the number of "/" in the path. Hence, in the example of FIG. 4, the hierarchical depth is equal to 0, and in the example of FIG. 7, the hierarchical depth is equal to 1. When the upper limit is not exceeded, control is transferred to step S602. When the upper limit is exceeded, control is transferred to step S612.

When the upper limit is exceeded and control is transferred to step S612, the projection control unit 37 does not acquire the content information and does not communicate with the server 11. Hence, the projection control unit 37 does not make the determination as to whether reception of the content information is possible. In this case, the projection control unit 37 does not send to the image input management unit 32 a notification of content information but sends a notification of a hierarchical depth error to the UI unit 36 (S612). Then, the process of FIG. 8 is terminated. Upon reception of the hierarchical depth error notification, the UI unit 36 displays an error notification screen as shown in FIG. 9, in order to notify the user of the error.

Figure 9:
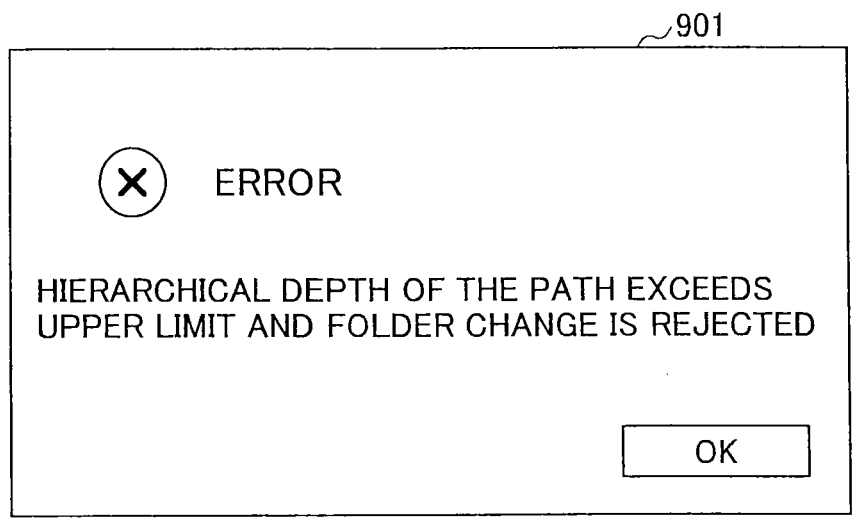
FIG. 9 is a diagram showing an example of an error notification screen which is displayed in a case of a hierarchical depth error.

FIG. 9 shows an example of an error notification screen 901 which is displayed in a case of a hierarchical depth error. As shown in FIG. 9, a message "Hierarchical depth of the path exceeds upper limit and folder change is rejected" is displayed. The user views the error notification screen and may grasp that the content information of the selected folder may not be displayed.

Referring back to FIG. 8, when the upper limit is not exceeded and control is transferred to step S602, the projection control unit 37 reads a server URL from the storage unit 41 (S602).

Subsequently, the projection control unit 37 acquires the content information through the communication unit (server) 38 (S603). The URL at this time is in a form in which the path specified in step S601 is combined with the server URL acquired in step S602.

Subsequently, the projection control unit 37 determines whether reception of the content information is possible (S604). First, the communication unit (server) 38 establishes a TCP/IP connection or UDP connection between the projector 100 and the server 11. A known three-way handshake technique may be used for establishment of the connection. Moreover, the communication unit (server) 38 communicates with the server 11 by HTTP. When a status code of an HTTP response from the server 11 is "200 OK", the projection control unit 37 determines that reception of the content information is possible. Otherwise the projection control unit 37 determines that reception of the content information is impossible. In addition, another communication protocol other than HTTP may be used for making the determination as to whether reception of the content information is possible. In such a case, definition of an error code when it is determined that reception of the content information is impossible is needed. For example, when a status code of a response in the case of WebDAV is "200", it may be determined that reception of the content information is possible. Moreover, when a status code of a response in the case of SMB is "0x00", it may be determined that reception of the content information is possible.

When it is determined in step S604 that reception of the content information is possible, control is transferred to S605. When it is determined in step S604 that reception of the content information is impossible, control is transferred to S610.

Figure 10:
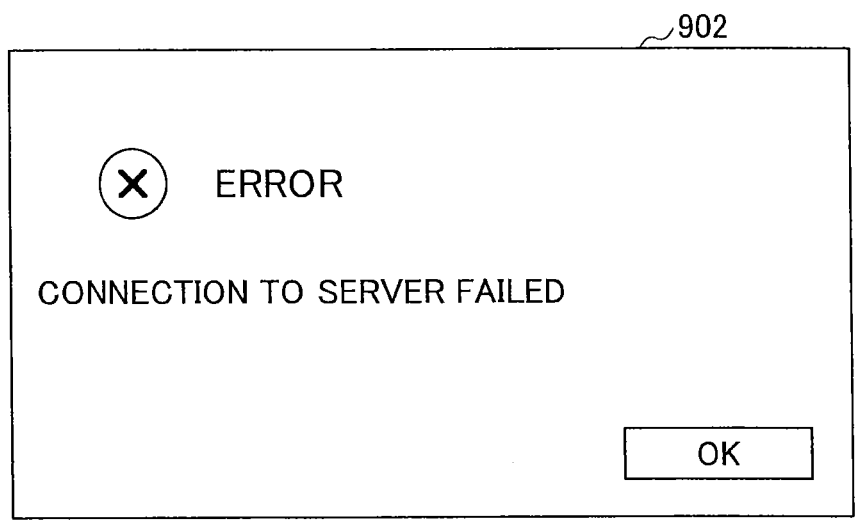
FIG. 10 is a diagram showing an example of an error notification screen which is displayed when content information may not be acquired.

When it is determined in step S604 that reception of the content information is impossible, the projection control unit 37 determines that the projector 100 may not perform the image projection, and sends a notification of the absence of the video signal to the image input management unit 32 (S610). In this case, there is no image file according to the file input and switching of the input interfaces to the image input is not needed. Moreover, in this case, the projection control unit 37 sends a notification of an acquisition error to the UI unit 36 (S611). Upon reception of the acquisition error notification, the UI unit 36 displays an error notification screen as shown in FIG. 10, in order to notify the user of the error. Then, the process of FIG. 8 is terminated.

FIG. 10 shows an example of an error notification screen 902 which is displayed when the content information may not be acquired. As shown in FIG. 10, a message "Connection to server failed" is displayed. The user views the error notification screen and may grasp that the communication with the server failed.

Referring back to FIG. 8, when the content information may be acquired in step S604, the projection control unit 37 determines whether the number of content items included in the content information acquired in step S603 is below an upper limit (second threshold) (S605). Because the number of content items which may be displayed on a screen is limited, the upper limit (second threshold) is predetermined for the number of content items according to the functional specifications. Hence, the determination step S605 is performed. When the upper limit is not exceeded in step S605, control is transferred to step S606. When the upper limit is exceeded in step S605, control is transferred to step S608.

When the upper limit is not exceeded in step S605, the projection control unit 37 sends a notification of the presence of the video signal to the image input management unit 32 (S606). In the case of the presence of the video signal, the image input is switched to the file input in the presence of the video signal.

Moreover, the projection control unit 37 sends a notification of the content information to the UI unit 36 (S607). Then, the process of FIG. 8 is terminated.

When the upper limit is exceeded in step S605, the projection control unit 37 sends a notification of the presence of the video signal to the image input management unit 32 (S608).

Figure 11:
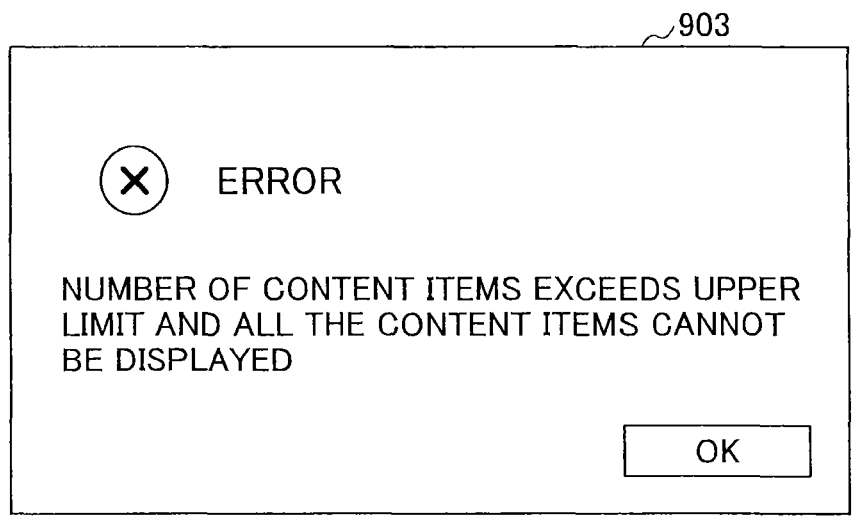
FIG. 11 is a diagram showing an example of a warning notification screen which is displayed when a part of content information may not be acquired.

Moreover, a part of the content information is eliminated so that the number of content items in the remaining content information may be below the upper limit, and the projection control unit 37 sends a notification of the partial content information to the UI unit 36 (S609). Then, the process of FIG. 8 is terminated. In addition, when a part of the content information is eliminated, the UI unit 36 displays a warning notification screen 903 as shown in FIG. 11, in order to notify the user of the warning. The part of the content information eliminated in this case corresponds to the content items whose sequential numbers when the file names/folder names are arrayed in alphabetical order exceed the upper limit.

FIG. 11 shows an example of a warning notification screen 903 which is displayed when a part of the content information may not be acquired. As shown in FIG. 11, a message "Number of content items exceeds upper limit and all the content items cannot be displayed" is displayed. The user views the warning notification screen and may grasp that there are files/folders which are not displayed.

In this way, the projection control unit 37 determines whether the content information has been acquired, and sends a notification of the presence of the video signal to the image input management unit 32 based on the result of the determination. If the presence of the video signal is determined because of the acquired content information, the switching of the input interfaces may be performed.

In this embodiment, even if the image input is changed to the server projection in step S2, the image projected remains unchanged until it is determined whether the content information may be acquired. When the image of the video signal is not projected in step S1, the image of the video signal is not projected in step S2. When the image of the video signal is projected in step S1, the already projected image of the video signal is continuously projected in step S2. Furthermore, when the presence of the video signal is notified in step S10, the server projection is changed to the image input.

In steps S1 and S2 of FIG. 4, the projection object source is changed to the server projection by the user's instruction. Alternatively, when the network interface 107 detects the file from the server 11, the process of steps S3-S14 may be performed. In this case, even if the user's instruction is not given, the image input may be automatically changed to the server projection.

Figure 12:
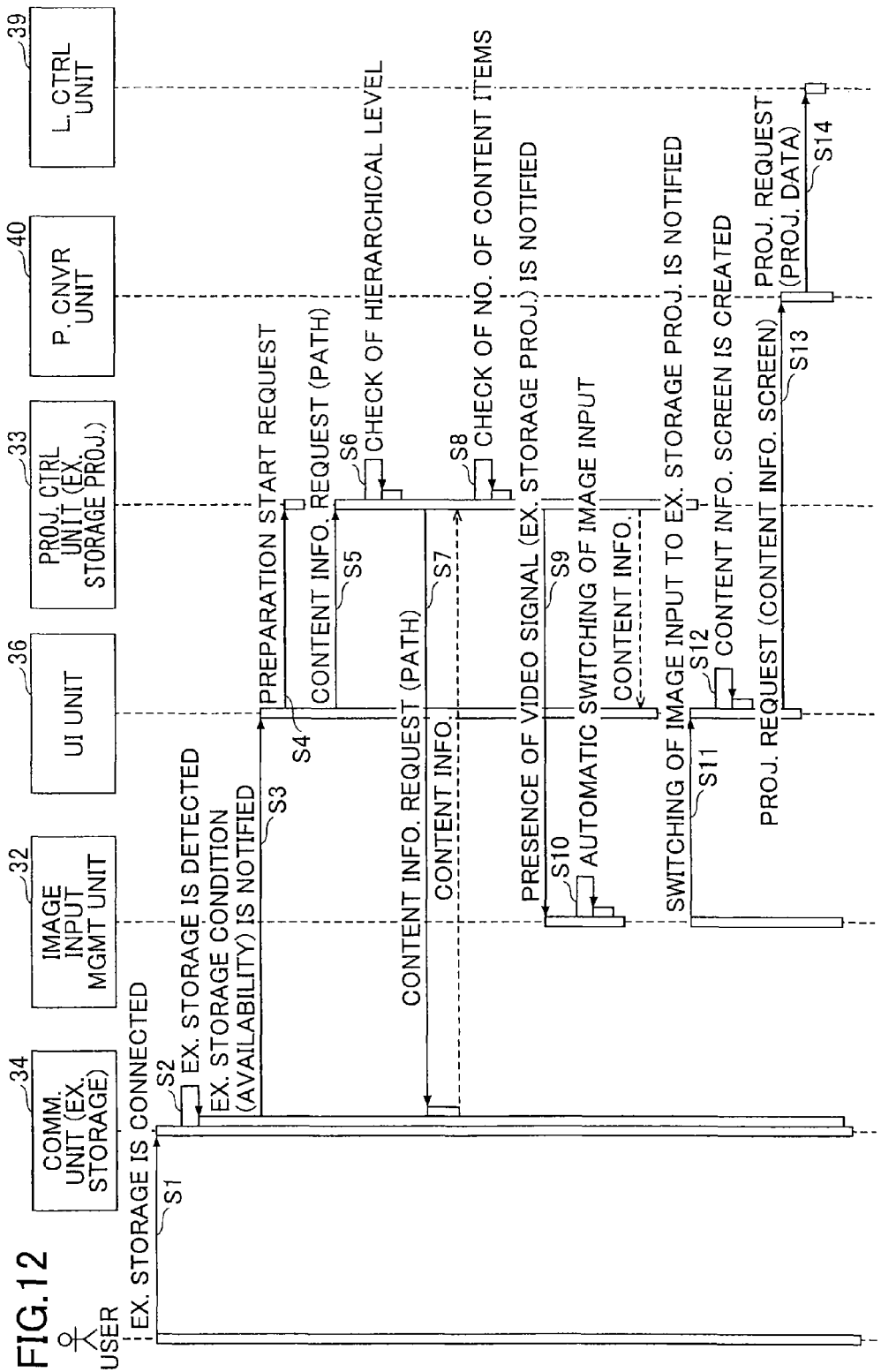
FIG. 12 is a sequence diagram for explaining a process in which the projector according to the embodiment acquires content from an external storage and projects an image of the content.

Next, the external storage projection is explained. A functional composition of the projector 100 according to the embodiment in the case of the external storage projection is the same as that shown in FIG. 3 and a description thereof will be omitted. FIG. 12 is a sequence diagram for explaining a process in which the projector 100 acquires content from the external storage unit 12 and projects an image of the content. In order to project an image of the content from the external storage unit 12, the projector 100 acquires the content information from the external storage unit 12 which indicates a detailed folder/file structure of the content from the external storage unit 12 and projects a screen of the content information. The process shown in FIG. 12 is described.

In step S1, a user connects (attaches) the external storage unit 12 to the projector 100. It is assumed that the projector 100 performs the server projection.

In step S2, the communication unit (external storage) 34 detects the connection of the external storage unit 12 to the projector 100.

In step S3, the communication unit (external storage) 34 sends to the UI unit 36 a notification that the external storage unit 12 is available. Specifically, when the OS detects that the external storage is mounted, the communication unit (external storage) 34 detects that the external storage unit 12 is available.

In step S4, the UI unit 36 sends a projection preparation start request to the projection control unit 33.

In step S5, the UI unit 36 sends a content information acquisition request to the projection control unit 33. At this time, specifying a path of the content information as an argument of the request is needed, and a root directory ("/") is specified as an initial value.

In step S6, the projection control unit 33 checks a hierarchical level of the specified path. This step has been described above with reference to FIG. 8.

In step S7, the projection control unit 33 sends a content information acquisition request to the communication unit (external storage) 34. In response to the request, the communication unit 34 accesses the external storage unit 12 and acquires the content information based on the path specified in step S5. The communication unit 34 transmits the acquired content information to the projection control unit 33.

In addition, the service provided in the OS may be used for acquisition of content information on an external storage. For example, in the case of the Windows system, a name of a file or a directory (folder) may be acquired by the "dir" command. A similar command is supported also in other OSs.

In step S8, the projection control unit 33 checks the number of content items included in the acquired content information. This step has been described above with reference to FIG. 8.

In addition, after step S8 is performed, the projection control unit 33 transmits the content information to the UI unit 36 as a response to the request in step S5.

In step S9, the projection control unit 33 sends to the image input management unit 32 a notification indicating the presence of a video signal of the external storage projection. This notification is sent to the image input management unit 32 when the content information has been acquired by the projection control unit 33. Hence, switching of the input interfaces to the image input may be performed only when the content information has been acquired.

In step S10, the image input management unit 32 performs switching of the input interfaces to the image input according to the presence or absence of the video signal. In this case, the video signal of the server projection is absent and the video signal of the external storage projection is present, and the image input of the projector 100 is changed to the external storage unit 12. If the absence of the video signal is notified, the image input of the projector 100 is not changed to the external storage unit 12.

In step S11, the image input management unit 32 sends to the UI unit 36 a notification that the image input is changed to the external storage projection.

In step S12, the UI unit 36 creates a content information screen in the acquired content information is displayed, in response to the notification that the image input is changed to the external storage projection.

In step S13, the UI unit 36 sends a projection request of the content information screen to the projection conversion unit 40. The projection conversion unit 40 converts image data of the content information screen into projection data in the format that controls the lamp control unit 39.

In step S14, the projection conversion unit 40 sends a projection request of the projection data of the content information screen to the lamp control unit 39. In response to the request, the lamp control unit 39 projects an image of the projection data.

The content information screen projected by the projector 100 according to the embodiment in the case of the external storage projection is essentially the same as the content information screen shown in FIG. 6.

Figure 13:
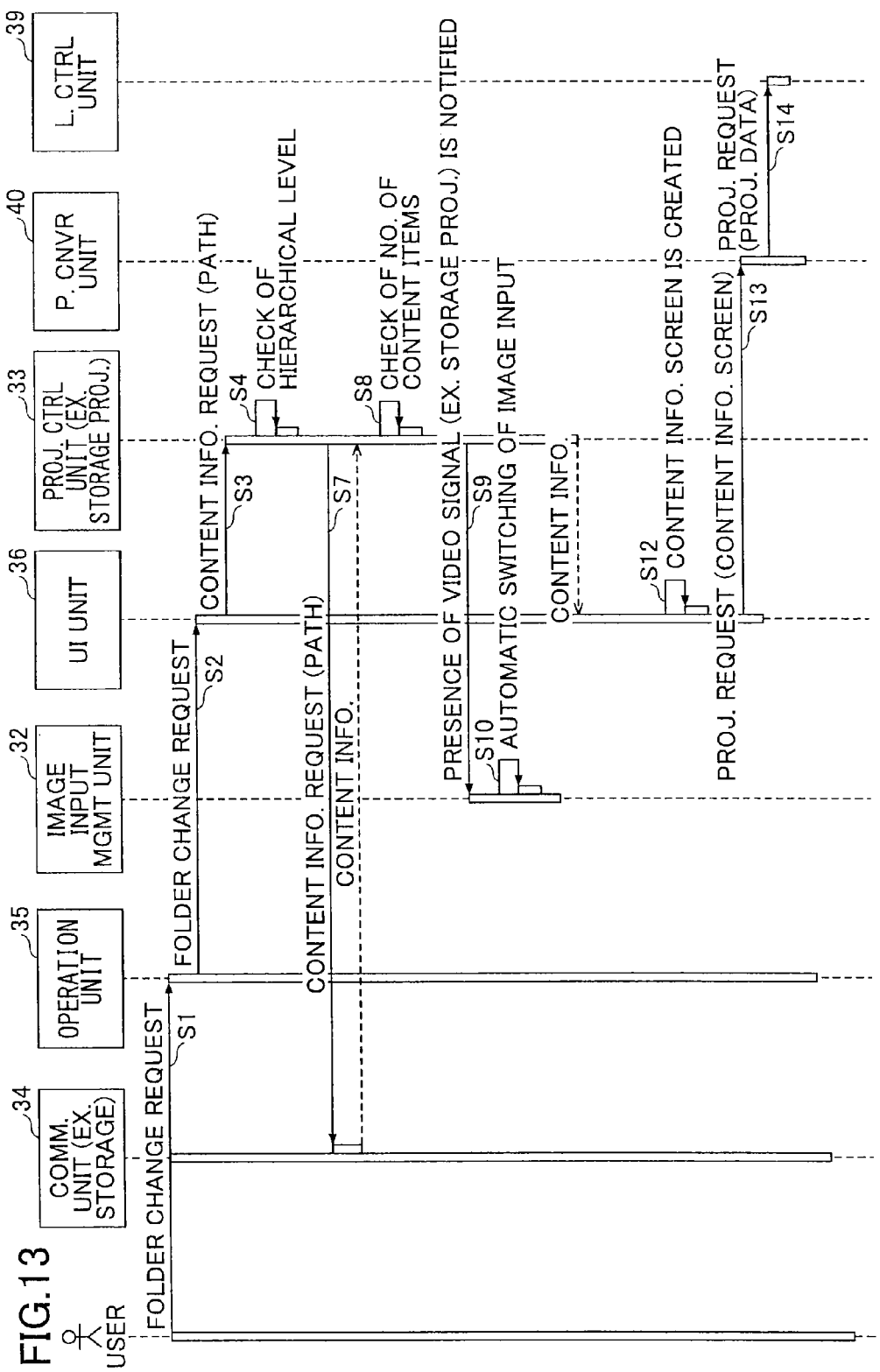
FIG. 13 is a sequence diagram for explaining a process performed by the projector according to the embodiment when a user selects a new folder.

FIG. 13 is a sequence diagram for explaining a process performed by the projector 100 according to the embodiment in the case of the external storage projection when a user selects a new folder. The process performed by the projector 100 in the case of the external storage projection when a user selects a new folder is essentially the same as the process shown in FIG. 7. The process of FIG. 13 differs from the process of FIG. 7 in that the projection control unit 33 is used to perform the process, instead of the projection control unit 37 which is used to perform the process shown in FIG. 7.

Figure 14:
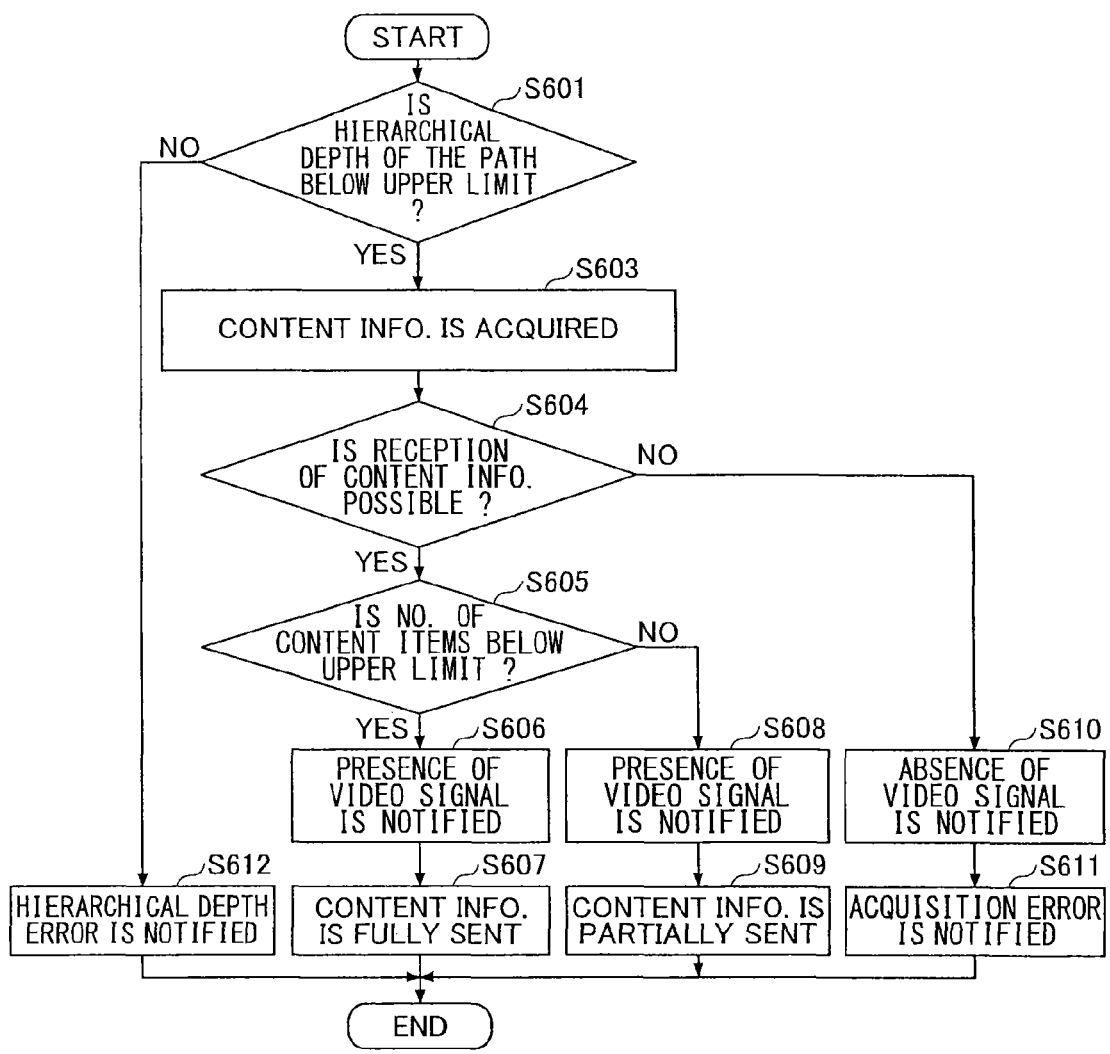
FIG. 14 is a flowchart for explaining a process in which a projection control unit (external storage projection) receives a content information acquisition request and returns a response to the content information acquisition request.

FIG. 14 is a flowchart for explaining a process in which the projection control unit 33 receives a content information acquisition request and returns a response to the content information acquisition request in the case of the external storage projection. The process of FIG. 14 differs from the process of FIG. 8 in that the acquisition of the server URL in step S602 of FIG. 8 is not needed for the process of FIG. 14. Other steps in the process of FIG. 14 are essentially the same as those corresponding steps in the process of FIG. 8.

Moreover, error notification screens in the case of the external storage projection are also essentially the same as those corresponding screens in the case of the server projection. However, when the acquisition of content information from the external storage unit 12 is impossible in step S604 in the process of FIG. 14, the UI unit 36 in step S611 displays an error notification screen as shown in FIG. 15, in order to notify the user of the error.

Figure 15:
FIG. 15 is a diagram showing an example of an error notification screen which is displayed when content information may not be acquired.

FIG. 15 shows an example of an error notification screen 904 displayed when content information may not be acquired. As shown in FIG. 15, a message "External storage device is not available" is displayed in the screen 904. The user views the error notification screen and may grasp that the acquisition of content information from the external storage failed.

When the content information may not be acquired, the switching of the input interfaces to the file input in step S10 in FIG. 12 may not be performed. Hence, when the content information may not be acquired, the image projection according to the other image input is continuously performed. Therefore, the switching of the input interfaces to the image input may be controlled based on whether the content information has been acquired.

As described above, the projector 100 according to the embodiment determines whether an image of the video signal according to the file input may be projected by making the determination as to whether a connection between the projector 100 and an external device is established and making the determination as to whether acquisition of content information from the external device is possible. Therefore, it is possible to perform the switching of the input interfaces only when an image of the video signal according to the file input may be properly projected.

Next, a description will be given of a projector 100 according to another embodiment. The projector 100 according to this embodiment is arranged so that, when acquiring content information from the server 11 or the external storage unit 12, the projector 100 further acquires content from the server 11 or the external storage unit 12.

A functional composition of the projector 100 according to this embodiment is the same as that of the foregoing embodiment shown in FIG. 3, and a description thereof will be omitted. Sequence diagrams for explaining overall processes performed by the projector 100 according to this embodiment are the same as those of the foregoing embodiment shown in FIG. 4 and FIG. 12, and a description thereof will be omitted.

Figure 16:
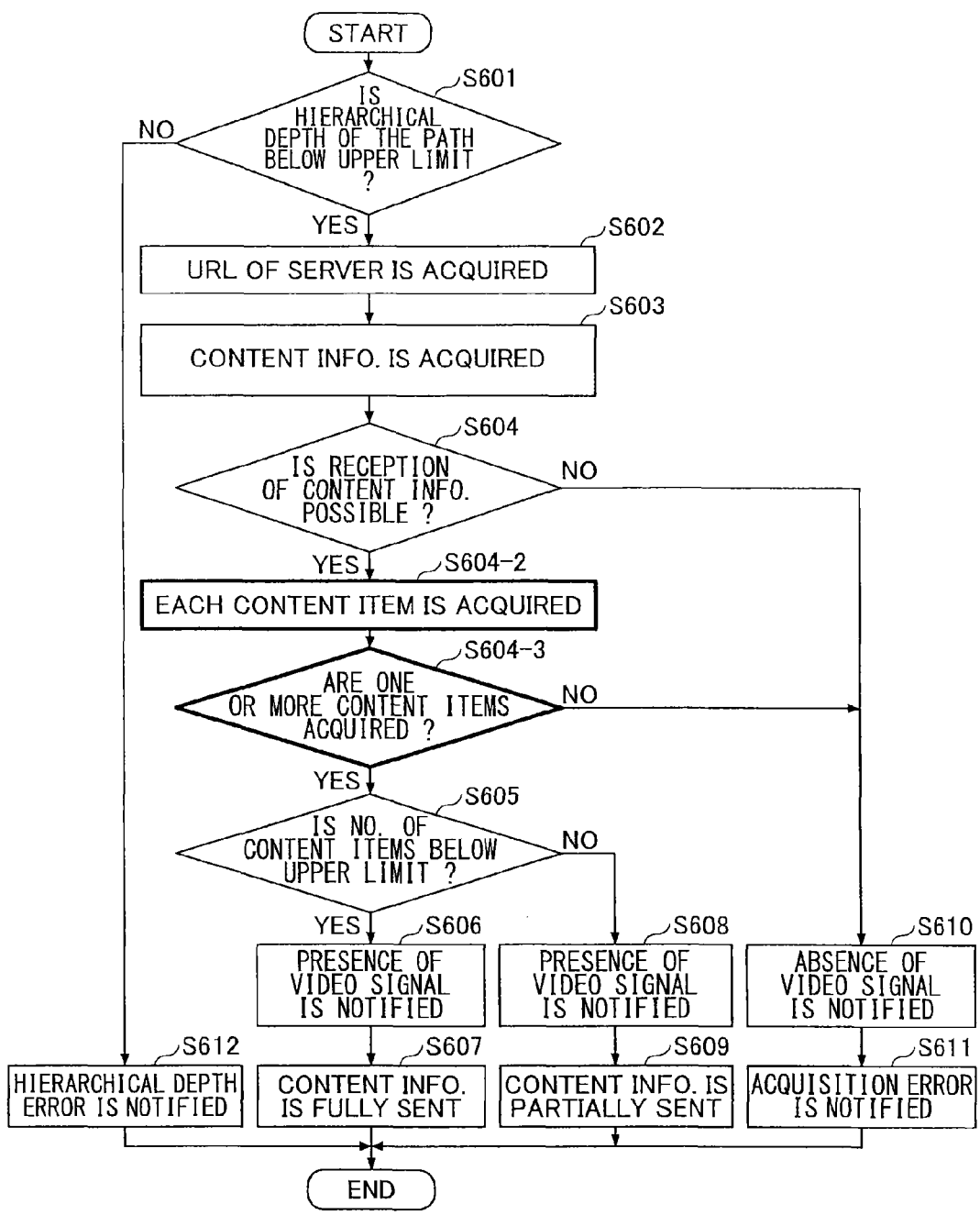
FIG. 16 is a flowchart for explaining a process in which a projection control unit (server projection) in a projector according to another embodiment receives a content information acquisition request and returns a response to the content information acquisition request.

FIG. 16 is a flowchart for explaining a process in which the projection control unit 37 according to this embodiment receives a content information acquisition request and returns a response to the content information acquisition request in the case of the server projection. In the process of FIG. 16, when reception of content information is possible in step S604, the projection control unit 37 further acquires the content.

Steps S601-S604 in the process of FIG. 16 S604 are the same as corresponding steps in the process of FIG. 8, and a description thereof will be omitted.

When reception of content information from the server 11 is possible in step S604, the projection control unit 37 sends a request of acquisition of the content included in the content information acquired in step S603 to the communication unit (server) 38 (S604-2). The projection control unit 37 acquires content items from the server 11 based on the number of content items included in the content information acquired in step S603. If both the content information and the content are acquired, acquisition of the content from the server 11 in response to receiving a selection of the content for image projection from the user is not needed.

The projection control unit 37 determines whether one or more content items have been acquired in step S604-2 (S604-3). When it is determined in step S604-3 that no content item has been acquired, control is transferred to step S610. In this case, the projection control unit 37 determines that the projector 100 may not perform the image projection even if the content information may be acquired, and sends a notification of the absence of a video signal to the image input management unit 32. Hence, the error notification screen shown in FIG. 10 is displayed.

When it is determined in step S604-3 that one or more content items have been acquired, the projection control unit 37 determines whether the number of content items included in the content information acquired in step S604-2 exceeds the upper limit (second threshold) (S605).

Subsequent steps S606-S612 in the process of FIG. 16 are essentially the same as those corresponding steps in the process of FIG. 8, and a description thereof will be omitted.

In addition, a process performed by the projection control unit 33 according to this embodiment when projecting an image of the content information from the external storage unit 12 is essentially the same as the process of FIG. 16. In this case, however, the acquisition of the server URL in step S602 of FIG. 16 is not needed.

In this way, the projection control unit 37 in the projector 100 according to this embodiment determines whether acquisition of content information is possible and determines whether acquisition of content is possible. Hence, the projector 100 according to this embodiment may determine more correctly whether an image of the video signal according to the file input is properly projected than in a case in which only the determination as to whether acquisition of content information is possible is made.

Next, a description will be given of a projector 100 according to another embodiment. The projector 100 according to this embodiment is arranged so that, when a folder is included in the acquired content information, the projector 100 further acquires content information from the folder.

A functional composition of the projector 100 according to this embodiment is the same as that of the foregoing embodiment shown in FIG. 3, and a description thereof will be omitted. Sequence diagrams for explaining overall processes performed by the projector 100 according to this embodiment are the same as those of the foregoing embodiment shown in FIG. 4 and FIG. 12, and a description thereof will be omitted.

Figure 17:
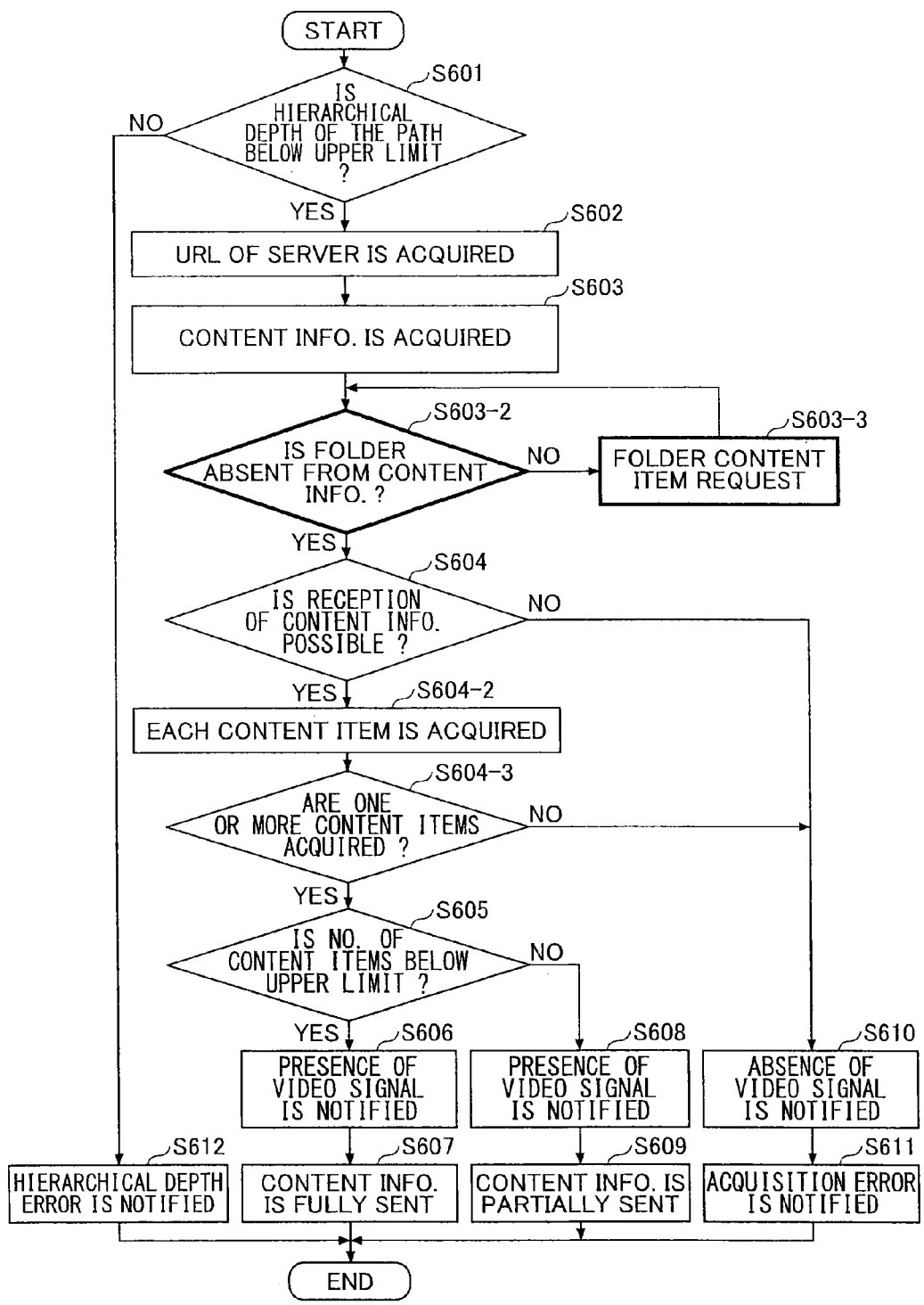
FIG. 17 is a flowchart for explaining a process in which a projection control unit (server projection) in a projector according to another embodiment receives a content information acquisition request and returns a response to the content information acquisition request.

FIG. 17 is a flowchart for explaining a process in which the projection control unit 37 according this embodiment receives a content information acquisition request and returns a response to the content information acquisition request in the case of the server acquisition. Steps S601-S603 in the process of FIG. 17 are the same as corresponding steps in the process of FIG. 16, and a description thereof will be omitted.

As shown in FIG. 17, the projection control unit 37 determines whether a folder is absent from the content information acquired in step S603 (S603-2). When the content information may not be acquired in step S603, the projection control unit 37 determines that a folder is absent, and control is transferred to step S604.

When it is determined in step S603-2 that a folder is included in the content information, the projection control unit 37 sends a content information acquisition request in the folder to the communication unit (server) 38 (S603-3). Control is transferred to step S603-2 again.

In step S603-2, the projection control unit 37 determines again whether a folder is absent from the content information acquired in step S603-3. By repeating steps S603-2 and S603-3, all the content information in subfolders may be acquired.

Subsequent steps S604-S612 in the process of FIG. 17 are the same as those corresponding steps in the process of FIG. 16, and a description thereof will be omitted. In this embodiment, the projection control unit 37 acquires all the content items from the acquired content information in step S604-2.

In addition, a process performed by the projection control unit 33 according to this embodiment when projecting an image of the content information from the external storage unit 12 is essentially the same as the process of FIG. 17. In this case, however, the acquisition of the server URL in step S602 is not needed.

In this way, the projection control unit 37 in the projector 100 according to this embodiment determines whether acquisition of content information is possible and determines whether acquisition of content items included in each of all the folders in the content information is possible. Hence, the projector 100 according to this embodiment may determine more correctly whether a video signal according to the file input is present than in a case in which only the determination as to whether acquisition of content items in a folder is made.

Next, a description will be given of a projector 100 according to another embodiment. The projector 100 according to this embodiment is arranged so that the projector 100 acquires content information from a plurality of servers 11 or a plurality of external storage units 12.

A functional composition of the projector 100 according to this embodiment is the same as that of the foregoing embodiment shown in FIG. 3, a description thereof will be omitted. The plurality of servers 11 is an example of a plurality of external storage units of a same type in the appended claims, and the plurality of external storage units 12 is an example of a plurality of external storage units of a same type in the appended claims.

Figure 18:
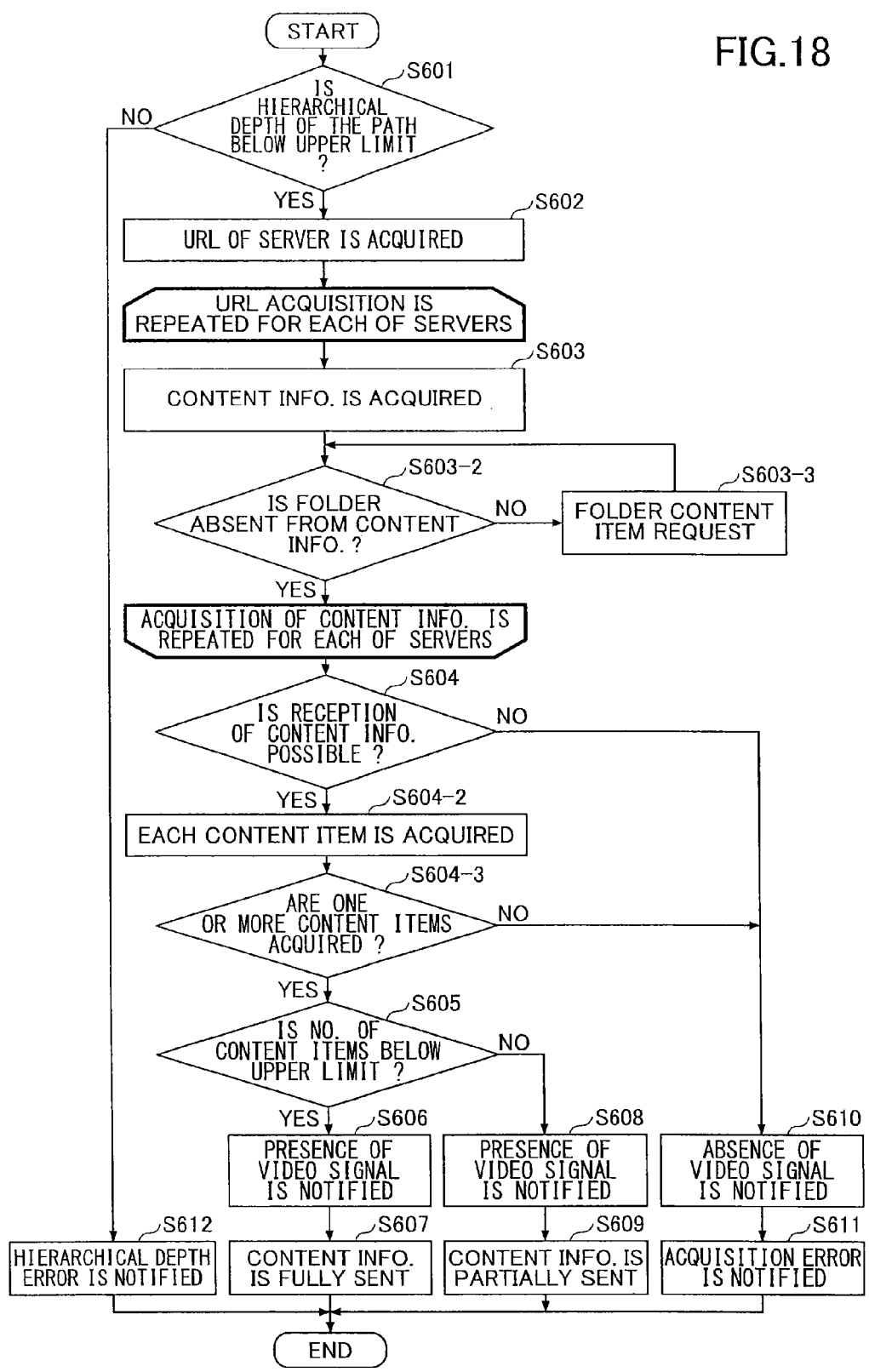
FIG. 18 is a flowchart for explaining a process in which a projection control unit (server projection) in a projector according to another embodiment receives a content information acquisition request and returns a response to the content information acquisition request.

FIG. 18 is a flowchart for explaining a process in which the projection control unit 37 according to this embodiment receives a request of acquisition request of content information and returns a response to the content information acquisition request in the case of the server projection. The process of FIG. 18 is similar to the process of FIG. 17 but differs from the process of FIG. 17 in the following points:

the storage unit 41 is configured to store a plurality of server URLs;

the projection control unit 37 is configured to acquire the plurality of server URLs from the storage unit 41 in step S602; and the projection control unit 37 is configured to repeat the acquisition of content information in step S603-3 for each of the plurality of server URLs acquired in step S602.

In this way, the projection control unit 37 acquires content information from each of the plurality of servers 11. If content information may be acquired from one or more of the plurality of servers, the image input is switched to the file input in the presence of the video signal. Moreover, if there is a server 11 from which the content information may not be acquired, an error notification screen is projected by the projector 100.

In addition, a process performed by the projector 100 according to this embodiment when projecting an image of the content information in the case of the external storage projection is essentially the same as that of the process of FIG. 18. In this case, however, the acquisition of the server URL in step S602 is not needed. Moreover, in this case, content information is acquired from all of the attached external storage units 12 attached to the projector 100 in step S603, and the processing after step S603 is repeated for the number of the external storage units 12.

Next, a description will be given of a projector 100 according to another embodiment. The projector 100 according to this embodiment is arranged to allow a user to change a setting (server URL) needed for the server projection or register a new server URL. For example, the projector 100 performs the following process in which the user changes a server URL or registers a new server URL.

Figure 19:
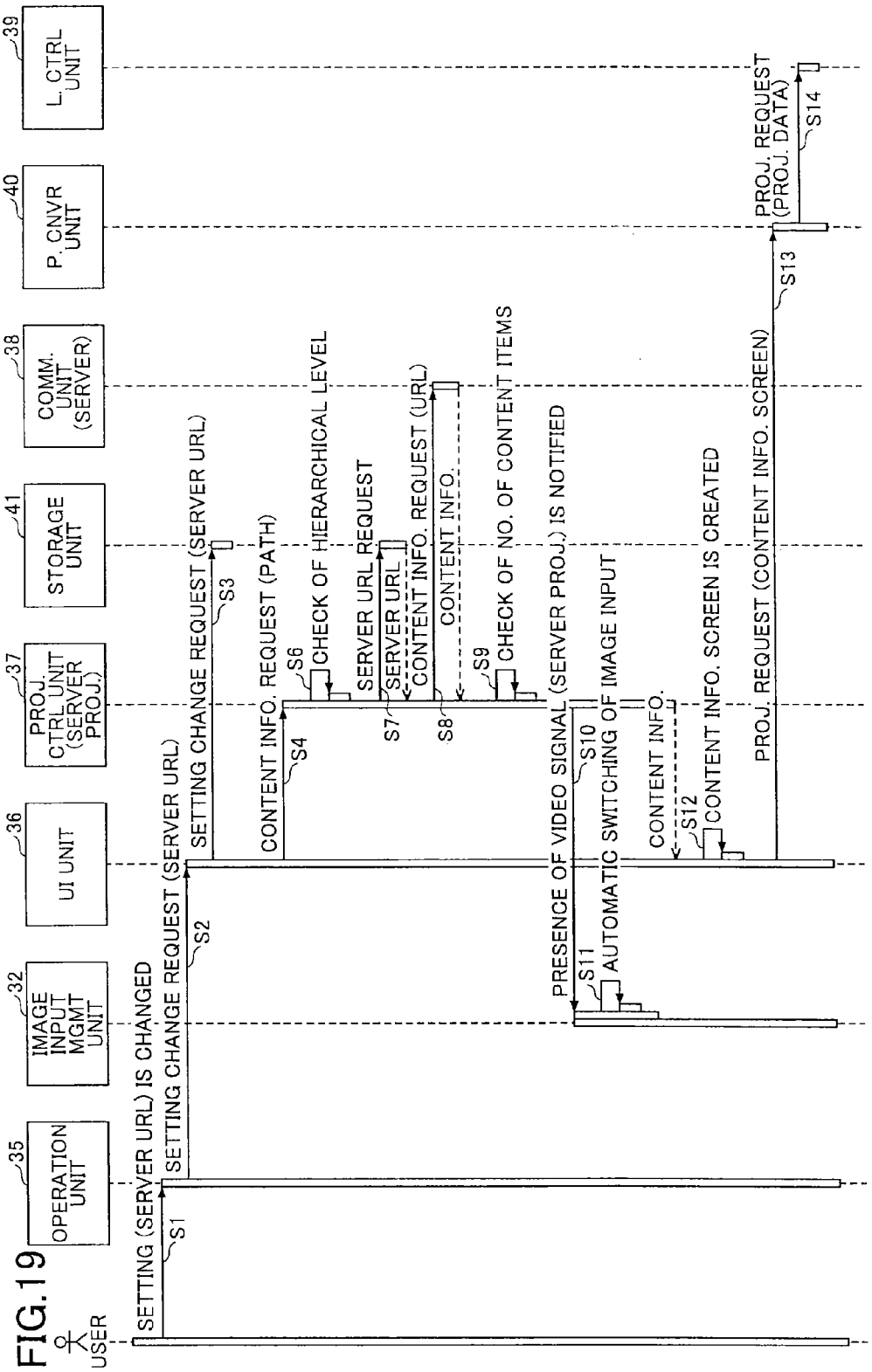
FIG. 19 is a sequence diagram for explaining a process performed by a projector according to another embodiment when a setting (server URL) needed for server projection is changed by a user.

FIG. 19 is a sequence diagram for explaining a process performed by the projector 100 according to this embodiment when a setting (server URL) needed for the server projection is changed by a user. The process of FIG. 19 is described.

In step S1, a user operates the operation unit 35 to change a setting (server URL) to a new setting by inputting the new setting or reading the new setting from the external storage unit 12.

In step S2, the operation unit 35 sends a setting change request to the UI unit 36 by setting the new server URL as an argument of the request.

In step S3, the UI unit 36 sends the setting change request (server URL) to the storage unit 41. In response to the request, the storage unit 41 rewrites the server URL stored therein into the new server URL. Alternatively, the storage unit 41 may add the new server URL.

In step S4, the UI unit 36 determines that updating the content information in response to the change of the setting (server URL) is needed, and sends a content information acquisition request to the projection control unit 37. Hence, step S4 in the process of FIG. 19 is the same as step S5 in the process of FIG. 4. Subsequent steps S6-S14 in the process of FIG. 19 are the same as those corresponding steps in the process of FIG. 4, and a description thereof will be omitted.

If the content information may be acquired in step S8, a screen of the content information of the server 11 after the change of the setting may be projected. If the content information may not be acquired in step S8, the error notification screen shown in FIG. 10 is displayed and a notification indicating the absence of a video signal is sent to the image input management unit 32. In this case, the image projection according to the present image input is continuously performed.

In this way, if the user changes the setting (server URL) needed for the server projection, the UI unit 36 sends a content information acquisition request to the projection control unit 37. The projection control unit 37 determines whether the projector 100 may perform the image projection according to the new setting, and may change the presence or absence of the video signal based on the result of the determination.

In addition, in the case of the external storage projection, the determination as to whether acquisition of content information is possible is made when the user attaches a new external storage unit 12 to the projector 100, and it is not necessary for the projector 100 to perform the process as shown in FIG. 19.

Next, a description will be given of a projector 100 according to another embodiment. The projector 100 according to this embodiment is arranged to perform a projection end process when the server projection is ended by a user.

Figure 20:
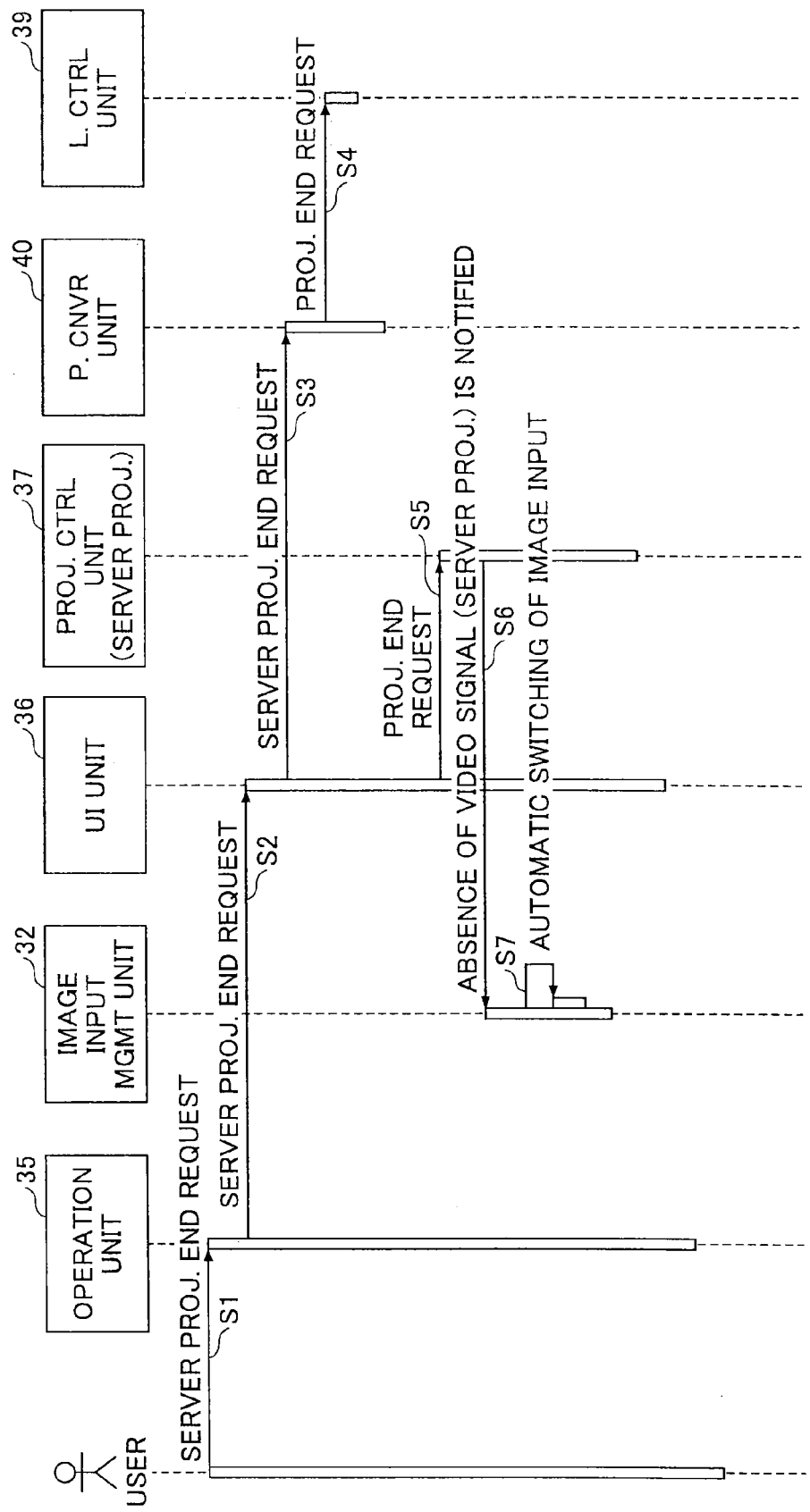
FIG. 20 is a sequence diagram for explaining a process performed by a projector according to another embodiment when server projection is ended by a user.

FIG. 20 is a sequence diagram for explaining a projection end process performed by the projector 100 according to this embodiment when the server projection is ended by the user. The process of FIG. 20 is described.

In step S1, the user operates the operation unit 35 to end the function of the server projection of the projector 100. For example, the user may press an end button displayed in a screen of the projector 100.

In step S2, the operation unit 35 sends a server projection end request to the UI unit 36.

In step S3, the UI unit 36 sends a projection end request to the projection conversion unit 40.

In step S4, the projection conversion unit 40 sends the projection end request to the lamp control unit 39. The lamp control unit 39 performs a process that extinguishes the displayed screen.

In step S5, the UI unit 36 sends a projection end request to the projection control unit 37.

In step S6, the projection control unit 37 sends to the image input management unit 32 a notification indicating the absence of the video signal of the server projection.

In step S7, the image input management unit 32 performs switching of the input interfaces to the image input automatically according to the response of the presence of the video signal or the absence of the video signal. In this case, the absence of the video signal is returned, and if there is the other image input (the external storage projection, the cable input, etc.) in which the video signal is present, the image projection according to the other image input is continuously performed.

In addition, a projection end process performed by the projector 100 according to this embodiment when the external storage projection is ended by the user is essentially the same as the process of FIG. 20. In the case of the external storage projection, the projection control unit 37 shown in FIG. 20 is replaced by the projection control unit (external storage) 33. In this case, the absence of the video signal of the external storage unit 12 is returned, and if there is another image input (the server projection, the cable input, etc.) in which the video signal is present, the image projection according to the other image input is continuously performed.

In this way, when the user explicitly requests termination of the server projection, the projection control unit 37 determines the absence of the video signal. If there is the other image input in which the video signal is present, the image projection according to the other image input is continuously performed.

As described in the foregoing, it is possible to provide a video output apparatus which performs switching of the input interfaces when an image of a video signal according to the file input from the server or the external storage may be properly projected.

The video output apparatus according to the present invention is not limited to the above-described embodiments, and variations and modifications may be made without departing from the scope of the present invention.

The present application is based upon and claims the benefit of priority of Japanese Patent Application No. 2013-099604, filed on May 9, 2013, the contents of which are incorporated herein by reference in their entirety.

What is claimed is:

1. A video output apparatus which outputs image information items received from external storage units, comprising:
    an image information acquisition unit configured to acquire the image information items from external storage units through a plurality of input interfaces;
    a path reception unit configured to receive a path of the image acquisition information in a file system of the video output apparatus;
    an output object management unit configured to manage one of the image information items as an output object among the image information items acquired by the image information acquisition unit;
    an image information presence determination unit configured to send a notification of presence or absence of image information to the output object management unit for each of the plurality of input interfaces based on a result of determination as to whether image acquisition information for acquiring image information has been acquired by the image information acquisition unit; and
    an output unit configured to output an image information item acquired through one of the plurality of input interfaces, the one of the plurality of input interfaces being associated with a notification of a presence of image information received from the image information presence determination unit at the output object management unit,
    wherein the image information presence determination unit is configured to determine whether a hierarchical depth of the received path is below a first threshold, and when the hierarchical depth exceeds the first threshold, the image information presence determination unit does not acquire the image acquisition information and causes a message output unit to output a hierarchical depth error message.

2. The video output apparatus according to claim 1, wherein:
    when the image acquisition information has been acquired, the image information presence determination unit is configured to send to the output object management unit a notification of the presence of image information from the one of the plurality of input interfaces through which the image acquisition information is acquired; and
    when the image acquisition information has not been acquired, the image information presence determination unit is configured to send to the output object management unit a notification of the absence of image information from the one of the plurality of input interfaces through which the image acquisition information is acquired.

3. The video output apparatus according to claim 1, wherein the image information presence determination unit is configured to determine whether the number of image information items included in the acquired image acquisition information is below a second threshold, and, when the number of the image information items exceeds the second threshold, the image information presence determination unit is configured to send to the output object management unit a notification of the presence of image information from the one of the plurality of input interfaces through which the image acquisition information is acquired.

4. The video output apparatus according to claim 1, wherein:
   when the image acquisition information has been acquired, the image information presence determination unit is configured to cause the image information acquisition unit to acquire image information items included in the image acquisition information;
   when one or more of the image information items have been acquired, the image information presence determination unit is configured to send to the output object management unit a notification of the presence of image information from the one of the plurality of input interfaces through which the image acquisition information is acquired; and
   when no image information item has been acquired, the image information presence determination unit is configured to send to the output object management unit a notification of the absence of image information from the one of the plurality of input interfaces through which the image acquisition information is acquired.

5. The video output apparatus according to claim 1, wherein:
   when a folder or a directory containing image information items is included in the image acquisition information, the image information presence determination unit is configured to cause the image information acquisition unit to acquire the image information items contained in the folder or the directory;
   when one or more of the image information items have been acquired, the image information presence determination unit is configured to send to the output object management unit a notification of the presence of image information from the one of the plurality of input interfaces through which the image acquisition information is acquired; and
   when no image information item has been acquired, the image information presence determination unit is configured to send to the output object management unit a notification of the absence of image information from the one of the plurality of input interfaces through which the image acquisition information is acquired.

6. The video output apparatus according to claim 1, wherein:
   when a plurality of external storage units of a same type exist, the image information presence determination unit is configured to cause the image information acquisition unit to acquire the image acquisition information from each of the external storage units of the same type and acquire image information items included in the image acquisition information acquired from each of the external storage units of the same type;
   when the image information items have been acquired from one or more of the external storage units of the same type, the image information presence determination unit is configured to send a notification of the presence of image information from one or more input interfaces connected to the one or more of the external storage units of the same type to the output object management unit; and
   when no image information item has been acquired from the external storage units of the same type, the image information presence determination unit is configured to send a notification of the absence of image information from the one or more input interfaces connected to the external storage units of the same type to the output object management unit.

7. The video output apparatus according to claim 1, further comprising:
   a setting registration reception unit configured to receive a setting registration request of an external storage unit; and
   an acquisition request unit configured to send, when the setting registration request of the external storage unit is received by the setting registration reception unit, to the image information acquisition unit a request of acquisition of image information to acquire the image acquisition information from the external storage unit associated with the received setting registration request.

8. The video output apparatus according to claim 1, further comprising an output end reception unit configured to receive an output end request in which one of the plurality of input interfaces is specified,
   wherein, when the output end request is received by the output end reception unit, the image information presence determination unit sends to the output object management unit a notification of absence of image information from the one of the plurality of input interfaces specified in the output end request.

9. A video input determination method performed by a video output apparatus which outputs one of image information items received from external storage units, the method comprising:
   acquiring, by an image information acquisition unit, the image information items input from the external storage units through a plurality of input interfaces of the video output apparatus respectively;
   receiving, by a path reception unit, a path of the image acquisition information in a file system of the video output apparatus;
   managing, by an output object management unit, one of the image information items as an output object among the acquired image information items;
   sending, by an image information presence determination unit, a notification of presence or absence of image information to the output object management unit for each of the plurality of input interfaces based on a result of determination as to whether image acquisition information for acquiring image information has been acquired; and
   outputting, by an output unit, an image information item acquired through one of the plurality of input interfaces associated with the notification of the presence of the image information received from the image information presence determination unit at the output object management unit,
   wherein whether a hierarchical depth of the received path is below a first threshold is determined, and when the hierarchical depth exceeds the first threshold, the image acquisition information is not acquired and a hierarchical depth error message is output.

* * * * *